(12) United States Patent
Alfarra et al.

(10) Patent No.: US 11,146,115 B2
(45) Date of Patent: *Oct. 12, 2021

(54) CONFORMAL WAVE SELECTOR

(71) Applicant: Ossia Inc., Bellevue, WA (US)

(72) Inventors: Anas M. A. Alfarra, Bellevue, WA (US); Hatem I. Zeine, Bellevue, WA (US); Caner Guclu, Bellevue, WA (US)

(73) Assignee: OSSIA INC., Redmond, WA (US)

( * ) Notice: Subject to any disclaimer, the term of this patent is extended or adjusted under 35 U.S.C. 154(b) by 184 days.

This patent is subject to a terminal disclaimer.

(21) Appl. No.: 16/594,294

(22) Filed: Oct. 7, 2019

(65) Prior Publication Data

US 2020/0036233 A1  Jan. 30, 2020

Related U.S. Application Data

(63) Continuation of application No. 15/966,803, filed on Apr. 30, 2018, now Pat. No. 10,439,443.

(51) Int. Cl.
*H01Q 15/23* (2006.01)
*H02J 50/23* (2016.01)
*B23P 19/04* (2006.01)
*B29C 65/48* (2006.01)
*H04W 84/12* (2009.01)

(52) U.S. Cl.
CPC .............. *H02J 50/23* (2016.02); *B23P 19/04* (2013.01); *B29C 65/48* (2013.01); *H04W 84/12* (2013.01)

(58) Field of Classification Search
CPC ................................ H02J 50/23; H01Q 15/23
USPC ........................................................ 343/909
See application file for complete search history.

(56) References Cited

U.S. PATENT DOCUMENTS

| | | |
|---|---|---|
| 2010/0164295 A1 | 7/2010 | Ichikawa et al. |
| 2013/0214612 A1 | 8/2013 | Bae |
| 2016/0191121 A1 | 6/2016 | Bell et al. |
| 2016/0241087 A1 | 8/2016 | Bae |

OTHER PUBLICATIONS

Ossia Inc., "Real Wireless Power: A Guide to Our Interconnected Futures," pp. 1-12 (2017).

*Primary Examiner* — Daniel Cavallari
*Assistant Examiner* — Dru Parries
(74) *Attorney, Agent, or Firm* — Volpe Koenig

(57) ABSTRACT

Embodiments of a conformal wave selector and methods of application thereof are disclosed. A conformal wave selector comprises a first plurality of conductors arranged substantially in parallel in a first direction and in a first region and a second plurality of conductors arranged substantially in parallel in second direction that is normal to the first direction and in a second region that is different than the first region. The conductors are sized, spaced, and directionally arranged such that signals of particular wavelengths and unknown polarization are reflected and other signals are allowed to penetrate the conformal wave selector.

16 Claims, 17 Drawing Sheets

| APPLYING TO A SURFACE A FIRST SET OF PARALLEL CONDUCTORS TO ONE OR MORE REGIONS IN A FIRST DIRECTION | 1610 |

| APPLYING TO THE SURFACE A SECOND SET OF PARALLEL CONDUCTORS TO ONE OR MORE REGIONS IN A SECOND DIRECTION THAT IS NORMAL TO THE FIRST DIRECTION | 1620 |

| APPLY A COLLOID THAT CARRIES CONDUCTIVE THREAD TO A SURFACE | 1710 |

| MAGNETICALLY ALIGNING THE CONDUCTIVE THREAD | 1720 |

CONFORMAL WAVE SELECTOR

CROSS REFERENCE TO RELATED APPLICATIONS

This application is a continuation of U.S. patent application Ser. No. 15/966,803, filed Apr. 30, 2018, which is incorporated by reference as if fully set forth.

FIELD OF INVENTION

The embodiments described herein are improvements in an environment for wireless power transmission.

BACKGROUND

Conventional wireless power delivery charges a battery of an electronic device over a short range. Wireless charging has been limited to magnetic or inductive charging based solutions requiring the electronic device to be in contact with or within very close proximity to the wireless charger A typical environment for wireless power transmission is in-doors with objects interfering with a direct, line-of-sight path from a wireless power transmission system to a wireless power receiver client. A wireless power transmission system may utilize directed, multipath transmission to bounce power signals off of walls and objects to focus a wireless power transmission at the location of the wireless power receiver client. However, the objects off of which the directed, multipath wireless power transmissions are bounced may also allow a substantial portion of the associated signal power to penetrate and escape.

Therefore, a need exists to increase the amount of signal power that is reflected off of walls, ceilings, floors, and other objects to increase the signal power focused at the location of the wireless power receiver client while allowing other desired wireless signals such as Wi-Fi™ and cellular signals from outside of the room or building to reach devices within the room or building.

SUMMARY

Disclosed herein are embodiments of a conformal wave selector and methods of applying thereof. In one embodiment, a first set of conductors may be arranged substantially in parallel and in a direction of a first axis in a first region. A length of each of the first set of conductors may be substantially equal. The length may also be longer than a maximum wavelength of a first wireless radio frequency (RF) signal transmitted by a first wireless system. A width of each of the first set of conductors may be shorter than a minimum wavelength of a second wireless RF signal transmitted by another wireless system. A ratio of the width of each of the first set of conductors to a space between each of the first set of conductors may be lower than a capacitive coupling threshold, such that a capacitive coupling between the first set of conductors may not create an effective surface conductivity that interferes with a wave polarized normal to the first axis.

In an embodiment, a second set of conductors may be arranged substantially in parallel and in a direction of a second axis and in a second region. The second axis may be normal to the first axis and the second region may not overlap the first region. A length of each of the second set of conductors may be substantially the same as the length of each of the first set of conductors. A width of each of the second set of conductors may be substantially the same as the width of each of the first set of conductors. A ratio of the width of each of the second set of conductors to a space between each of the second set of conductors may be substantially the same as the ratio of the width of each of the first set of conductors to the space between each of the first set of conductors.

In an embodiment, the conformal wave selector may be operable to conform to a surface of an object to which the conformal wave selector is applied. The first set of conductors may be configured to reflect a portion of the first wireless RF signal polarized in the direction of the first axis, and the second set of conductors may be configured to reflect a portion of the first wireless RF signal polarized in the direction of the second axis. The conformal wave selector may be further configured to allow at least a portion of the second wireless RF signal to penetrate through the conformal wave selector.

In an embodiment, the first wireless RF system may include a wireless power transmission system (WPTS), and the first wireless RF signal may include a wireless power transmission.

In an embodiment, a number of conductors of the first set of conductors may be substantially the same as a number of conductors of the second set of conductors. In an embodiment, a size of the first region may be substantially the same as a size of the second region.

In an embodiment, the conformal wave selector may further include a first plurality of the first set of conductors, wherein each set of the first plurality may be disposed in a separate region from each other. The conformal wave selector may further include a second plurality of the second set of conductors, wherein each set of the second plurality may be disposed in a separate region from each other and from the first plurality. The surface of the object may comprise a plurality of regions arranged in a grid. The first plurality may occupy alternating regions of the grid in a first axis of the grid and may also occupy alternating regions of the grid in a second axis of the grid that is normal to the first axis of the grid. The second plurality may occupy alternating regions of the grid in the first and second axis of the grid that may be different than the alternating regions occupied by the first plurality.

In an embodiment, a number of sets of the first plurality may be substantially the same as a number of sets of the second plurality. In an embodiment, the first and second plurality may form a checkered pattern across the surface.

In an embodiment, substantially half of a power of the second wireless RF signal may penetrate the conformal wave selector. In an embodiment, the second wireless RF signal may be a Wi-Fi signal.

In an embodiment, a conformal wave selector including at least the first set of conductors and the second set of conductors may be applied to the surface by applying a colloid that may carry a conductive thread. The conductive thread may be magnetically aligned.

In an embodiment, a conformal wave selector including at least the first set of conductors and the second set of conductors may be applied to the surface by painting the surface with a chemical using a mask to create an antenna pattern and curing the antenna pattern with a light source.

BRIEF DESCRIPTION OF THE DRAWINGS

FIG. 16 depicts an example embodiment of a method for applying a conformal wave selector to a surface of an object.

FIG. 17 depicts another example embodiment of a method for applying a conformal wave selector to a surface of an object.

DETAILED DESCRIPTION OF THE PREFERRED EMBODIMENTS

Figure 1:
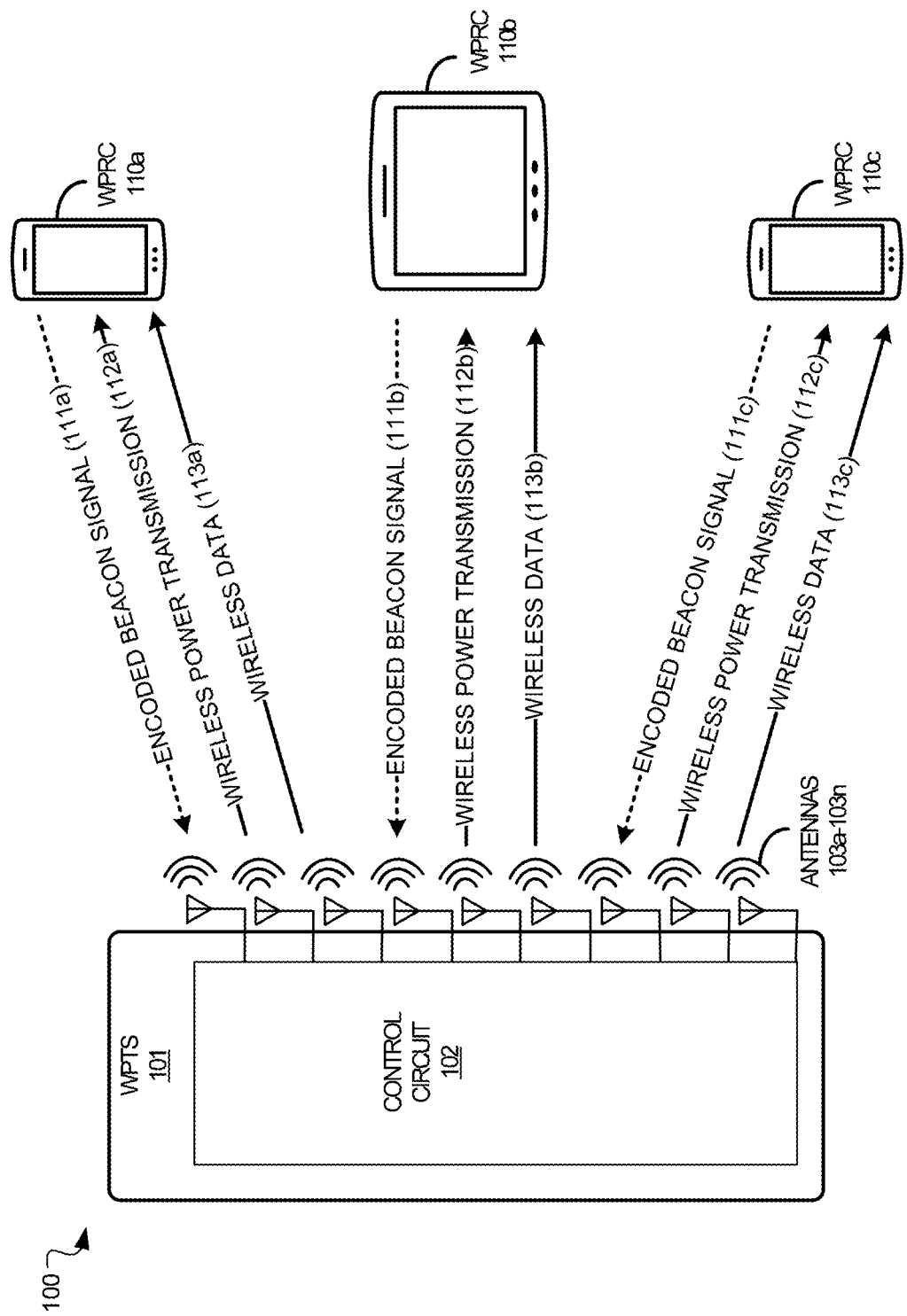
FIG. 1 depicts a system diagram including an example wireless power transmission environment.

FIG. 1 depicts a system diagram including an example wireless power transmission environment 100 illustrating wireless power delivery from one or more wireless power transmission systems (WPTSs), such as WPTS 101. More specifically, FIG. 1 illustrates power transmission to one or more wireless power receiver clients (WPRCs) 110a-110c. WPTS 101 may be configured to receive encoded beacons 111a-111c from and transmit wireless power 112a-112c and wireless data 113a-113c to WPRCs 110a-110c. WPRCs 110a-110c may be configured to receive and process wireless power 112a-112c from one or more WPTSs, such as WPTS 101. Components of an example WPTS 101 are shown and discussed in greater detail below, as well as in FIG. 2. Components of an example WPRC 110a-110c are shown and discussed in greater detail with reference to FIG. 3.

WPTS 101 may include multiple antennas 103a-103n, e.g., an antenna array including a plurality of antennas, which may be capable of delivering wireless power 112a-112c to WPRCs 110a-110c. In some embodiments, the antennas are adaptively-phased radio frequency (RF) antennas. The WPTS 101 may be capable of determining the appropriate phases with which to deliver a coherent power transmission signal to WPRCs 110a-110c. Each antenna of the antenna array including antennas 103a-103n may be configured to emit a signal, e.g. a continuous wave or pulsed power transmission signal, at a specific phase relative to each other antenna, such that a coherent sum of the signals transmitted from a collection of the antennas is focused at a location of a respective WPRC 110a-110c. Although FIG. 1 depicts wireless signals including encoded beacon signals 111a-111c, wireless power transmission 112a-112c, and wireless data 113a-113c each being transmitted by or received by a single antenna of the antennas 103a-103n of the WPTS 101, this should not be construed as limiting in any way. Any number of antennas may be employed in the reception and transmission of signals. Multiple antennas, including a portion of antennas 103a-103n that may include all of antennas 103a-103n, may be employed in the transmission and/or reception of wireless signals. It is appreciated that use of the term "array" does not necessarily limit the antenna array to any specific array structure. That is, the antenna array does not need to be structured in a specific "array" form or geometry. Furthermore, as used herein the term "array" or "array system" may be used include related and peripheral circuitry for signal generation, reception and transmission, such as radios, digital circuits and modems.

As illustrated in the example of FIG. 1, antennas 103a-103n may be included in WPTS 101 and may be configured to transmit both power and data and to receive data. The antennas 103a-103n may be configured to provide delivery of wireless radio frequency power in a wireless power transmission environment 100, to provide data transmission, and to receive wireless data transmitted by WPRCs 110a-110c, including encoded beacon signals 111a-111c. In some embodiments, the data transmission may be through lower power signaling than the wireless radio frequency power transmission. In some embodiments, one or more of the antennas 103a-103n may be alternatively configured for data communications in lieu of wireless power delivery. In some embodiments, one or more of the power delivery antennas 103a-103n can alternatively or additionally be configured for data communications in addition to or in lieu of wireless power delivery. The one or more data communication antennas are configured to send data communications to and receive data communications from WPRCs 110a-110c.

Each of WPRCs 110a-110c may include one or more antennas (not shown) for transmitting signals to and receiving signals from WPTS 101. Likewise, WPTS 101 may include an antenna array having one or more antennas and/or sets of antennas, each antenna or set of antennas being capable of emitting continuous wave or discrete (pulse) signals at specific phases relative to each other antenna or set of antennas. As discussed above, WPTSs 101 is capable of determining the appropriate phases for delivering the coherent signals to the antennas 103a-103n. For example, in some embodiments, delivering coherent signals to a particular WPRC can be determined by computing the complex conjugate of a received encoded beacon signal at each antenna of the array or each antenna of a portion of the array such that a signal from each antenna is phased appropriately relative to a signal from other antennas employed in delivering power or data to the particular WPRC that transmitted the beacon signal. The WPTS 101 can be configured to emit a signal (e.g., continuous wave or pulsed transmission signal) from multiple antennas using multiple waveguides at a specific phase relative to each other. Other techniques for delivering a coherent wireless power signal are also applicable such as, for example, the techniques discussed in U.S. patent application Ser. No. 15/852,216 titled "Anytime Beaconing In A WPTS" filed Dec. 22, 2017, in U.S. patent application Ser. No. 15/852,348 titled "Transmission Path Identification based on Propagation Channel Diversity" filed Dec. 22, 2017, in U.S. patent application Ser. No. 15/962,479 titled "Directional Wireless Power and Wireless Data Communication" filed Apr. 25, 2018; which are expressly incorporated by reference herein.

Although not illustrated, each component of the wireless power transmission environment 100, e.g., WPRCs 110a-110c, WPTS 101, can include control and synchronization mechanisms, e.g., a data communication synchronization module. WPTS 101 can be connected to a power source such as, for example, a power outlet or source connecting the WPTSs to a standard or primary alternating current (AC) power supply in a building. Alternatively, or additionally, WPTS 101 can be powered by a battery or via other mechanisms, e.g., solar cells, etc.

As shown in the example of FIG. 1, WPRCs 110a-110c include mobile phone devices and a wireless tablet. However, WPRCs 110a-110c can be any device or system that needs power and is capable of receiving wireless power via one or more integrated WPRCs. Although three WPRCs 110a-110c are depicted, any number of WPRCs may be supported. As discussed herein, a WPRC may include one or more integrated power receivers configured to receive and process power from one or more WPTSs and provide the power to the WPRCs 110a-110c or to internal batteries of the WPRCs 110a-110c for operation thereof.

As described herein, each of the WPRCs 110a-110c can be any system and/or device, and/or any combination of devices/systems that can establish a connection with another device, a server and/or other systems within the example wireless power transmission environment 100. In some embodiments, the WPRCs 110a-110c may each include displays or other output functionalities to present or transmit data to a user and/or input functionalities to receive data from the user. By way of example, WPRC 110a can be, but is not limited to, a video game controller, a server desktop, a desktop computer, a computer cluster, a mobile computing device such as a notebook, a laptop computer, a handheld computer, a mobile phone, a smart phone, a PDA, a Blackberry device, a Treo, and/or an iPhone, etc. By way of example and not limitation, WPRC 110a can also be any wearable device such as watches, necklaces, rings or even devices embedded on or within the customer. Other examples of WPRC 110a include, but are not limited to, a safety sensor, e.g. a fire or carbon monoxide sensor, an electric toothbrush, an electronic door lock/handle, an electric light switch controller, an electric shaver, an electronic shelf label (ESL), etc.

Although not illustrated in the example of FIG. 1, the WPTS 101 and the WPRCs 110a-110c can each include a data communication module for communication via a data channel. Alternatively, or additionally, the WPRCs 110a-110c can direct antennas to communicate with WPTS 101 via existing data communications modules. In some embodiments, the WPTS 101 can have an embedded Wi-Fi hub for data communications via one or more antennas or transceivers. In some embodiments, the antennas 103a-103n can communicate via Bluetooth™, Wi-Fi™, ZigBee™, etc. The WPRCs 110a-110c may also include an embedded Bluetooth™, Wi-Fi™, ZigBee™, etc. transceiver for communicating with the WPTS 101. Other data communication protocols are also possible. In some embodiments the beacon signal, which is primarily referred to herein as a continuous waveform, can alternatively or additionally take the form of a modulated signal and/or a discrete/pulsed signal.

WPTS 101 may also include control circuit 102. Control circuit 102 may be configured to provide control and intelligence to the WPTS 101 components. Control circuit 102 may comprise one or more processors, memory units, etc., and may direct and control the various data and power communications. Control circuit 102 may direct data communications on a data carrier frequency that may be the same or different than the frequency via which wireless power is delivered. Likewise, control circuit 102 can direct wireless transmission system 100 to communicate with WPRCs 110a-110c as discussed herein. The data communications can be, by way of example and not limitation, Bluetooth™, Wi-Fi™, ZigBee™, etc. Other communication protocols are possible.

It is appreciated that the use of the term "WPTS" does not necessarily limit the WPTS to any specific structure. That is, the WPTS does not need to be structured in a specific form or geometry. Furthermore, as used herein the term "transmission system" or "WPTS" may be used to include related and peripheral circuitry for signal generation, reception and transmission, such as radios, digital circuits and modems.

Figure 2:
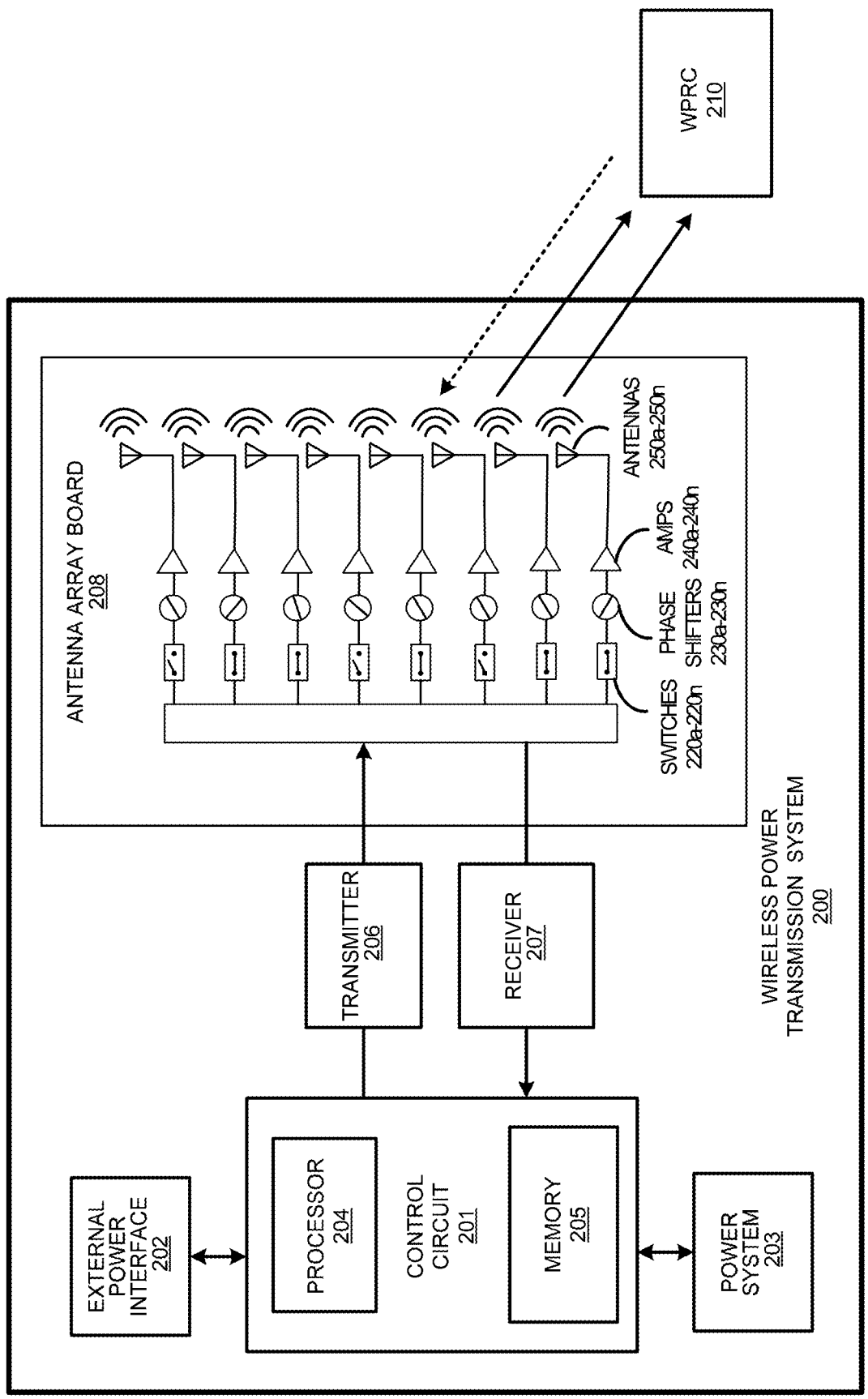
FIG. 2 is a block diagram illustrating example components of an example embodiment of a wireless power transmission system (WPTS).

FIG. 2 is a block diagram illustrating example components of a WPTS 200 in accordance with the embodiments described herein. As illustrated in the example of FIG. 2, the WPTS 200 may include a control circuit 201, external power interface 202, and power system 203. Control circuit 201 may include processor 204, for example a base band processor, and memory 205. Additionally, although only one antenna array board 208 and one transmitter 206 are depicted in FIG. 2, WPTS 200 may include one or more transmitters 206 coupled to one or more antenna array boards 208 and transmit signals to the one or more antenna array boards 208. Although only one receiver is depicted in FIG. 2, one or more receivers 207 may be coupled to the one or more antenna array boards 208 and may receive signals from the one or more antennas 250a-250n of the one or more antenna array boards 208. Each antenna array board 208 includes switches 220a-220n, phase shifters 230a-230n, power amplifiers 240a-240n, and antenna arrays 250a-250n. Although each switch, phase shifter, power amplifier, and antenna is depicted in a one-to-one relationship, this should not be construed as limiting. Additionally or alternatively, any number of switches, phase shifters, power amplifiers, and antennas may be coupled. Some or all of the components of the WPTS 200 can be omitted, combined, or sub-divided in some embodiments. Furthermore, the setting of the switches 220a-220n and phase shifters 230a-230n should not be construed as limiting. Any of the switches 220a-220n, phase shifters 230a-230n, and/or power amplifiers 240a-240n, or any combination thereof, may be individually controlled or controlled in groups. The signals transmitted and received by the one or more antenna array boards 208 may be wireless power signals, wireless data signals, or both.

Control circuit 201 is configured to provide control and intelligence to the array components including the switches 220a-220n, phase shifters 230a-230n, power amplifiers 240a-240n, and antenna arrays 250a-250n. Control circuit 201 may direct and control the various data and power communications. Transmitter 206 can generate a signal comprising power or data communications on a carrier frequency. The signal can be comply with a standardized format such as Bluetooth™, Wi-Fi™, ZigBee™, etc., including combinations or variations thereof. Additionally or alternatively, the signal can be a proprietary format that does not use Bluetooth™, Wi-Fi™, ZigBee™, and the like, and utilizes the same switches 220a-220n, phase shifters 230a-230n, power amplifiers 240a-240n, and antenna arrays 250a-250n to transmit wireless data as are used to transmit wireless power. Such a configuration may save on hardware complexity and conserve power by operating independently of the constraints imposed by compliance with the aforementioned standardized formats. In some embodiments, control circuit 201 can also determine a transmission configuration comprising a directional transmission through the control of the switches 220a-220n, phase shifters 230a-230n, and amplifiers 240a-240n based on an encoded beacon signal received from a WPRC 210.

The external power interface 202 is configured to receive external power and provide the power to various components. In some embodiments, the external power interface 202 may be configured to receive, for example, a standard external 24 Volt power supply. In other embodiments, the external power interface 202 can be, for example, 120/240 Volt AC mains to an embedded DC power supply which may source, for example, 12/24/48 Volt DC to provide the power to various components. Alternatively, the external power interface could be a DC supply which may source, for example, 12/24/48 Volts DC. Alternative configurations including other voltages are also possible.

Switches 220a-220n may be activated to transmit power and/or data and receive encoded beacon signals based on the state of the switches 220a-220n. In one example, switches 220a-220n may be activated, e.g. closed, or deactivated, e.g. open, for power transmission, data transmission, and/or encoded beacon reception. Additional components are also possible. For example, in some embodiments phase-shifters 230a-230n may be included to change the phase of a signal when transmitting power or data to a WPRC 210. Phase shifter 230a-230n may transmit a power or data signal to WPRC 210 based on a phase of a complex conjugate of the encoded beaconing signal from WPRC 210. The phase-shift may also be determined by processing the encoded beaconing signal received from WPRC 210 and identifying WPRC 210. WPTS 200 may then determine a phase-shift associated with WPRC 210 to transmit the power signal. In an example embodiment, data transmitted from the WPTS 200 may be in the form of communication beacons which may be used to synchronize clocks with WPRC 210. This synchronization may improve the reliability of beacon phase detection.

In operation, control circuit 201, which may control the WPTS 200, may receive power from a power source over external power interface 202 and may be activated. Control circuit 201 may identify an available WPRC 210 within range of the WPTS 200 by receiving an encoded beacon signal initiated by the WPRC 210 via at least a portion of antennas 250a-250n. When the WPRC 210 is identified based on the encoded beacon signal, a set of antenna elements on the WPTS may power on, enumerate, and calibrate for wireless power and/or data transmission. At this point, control circuit 201 may also be able to simultaneously receive additional encoded beacon signals from other WPRCs via at least a portion of antennas 250a-250n.

Once the transmission configuration has been generated and instructions have been received from control circuit 201, transmitter 206 may generate and transfer one or more power and/or data signal waves to one or more antenna boards 208. Based on the instruction and generated signals, at least a portion of power switches 220a-220n may be opened or closed and at least a portion of phase shifters 230a-230n may be set to the appropriate phase associated with the transmission configuration. The power and/or data signal may then be amplified by at least a portion of power amplifiers 240a-240n and transmitted at an angle directed toward a location of WPRC 210. As discussed herein, at least a portion of antennas 250a-250n may be simultaneously receiving encoded beacon signals from additional WPRCs 210.

As described above, a WPTS 200 may include one or more antenna array boards 208. In one embodiment, each antenna array board 208 may be configured to communicate with a single WPRC 210, so that a different antenna array board 208 of a plurality of antenna array boards 208 communicates with a different WPRC 210 of a plurality of WPRCs 210. Such an implementation may remove a reliance on a communication method, such as a low-rate personal area network (LR-WPAN), IEEE 802.15.4, or Bluetooth Low Energy (BLE) connection to synchronize with a WPRC 210. A WPTS 200 may receive a same message from a WPRC 210 via different antennas of antennas 250a-250n. The WPTS 200 may use the replication of the same message across the different antennas to establish a more reliable communication link. In such a scenario, a beacon power may be lowered since the lower power can be compensated by the improved reliability owed to the replicated received signals. In some embodiments, it may also be possible to dedicate certain antennas or groups of antennas for data communication and dedicate other antennas or groups of antennas for power delivery. For example, an example WPTS 200 may dedicate 8 or 16 antennas of antennas 250a-250n to data communication at a lower power level than some number of remaining antennas that may be dedicated to power delivery at a relatively higher power level than the data communication.

Figure 3:
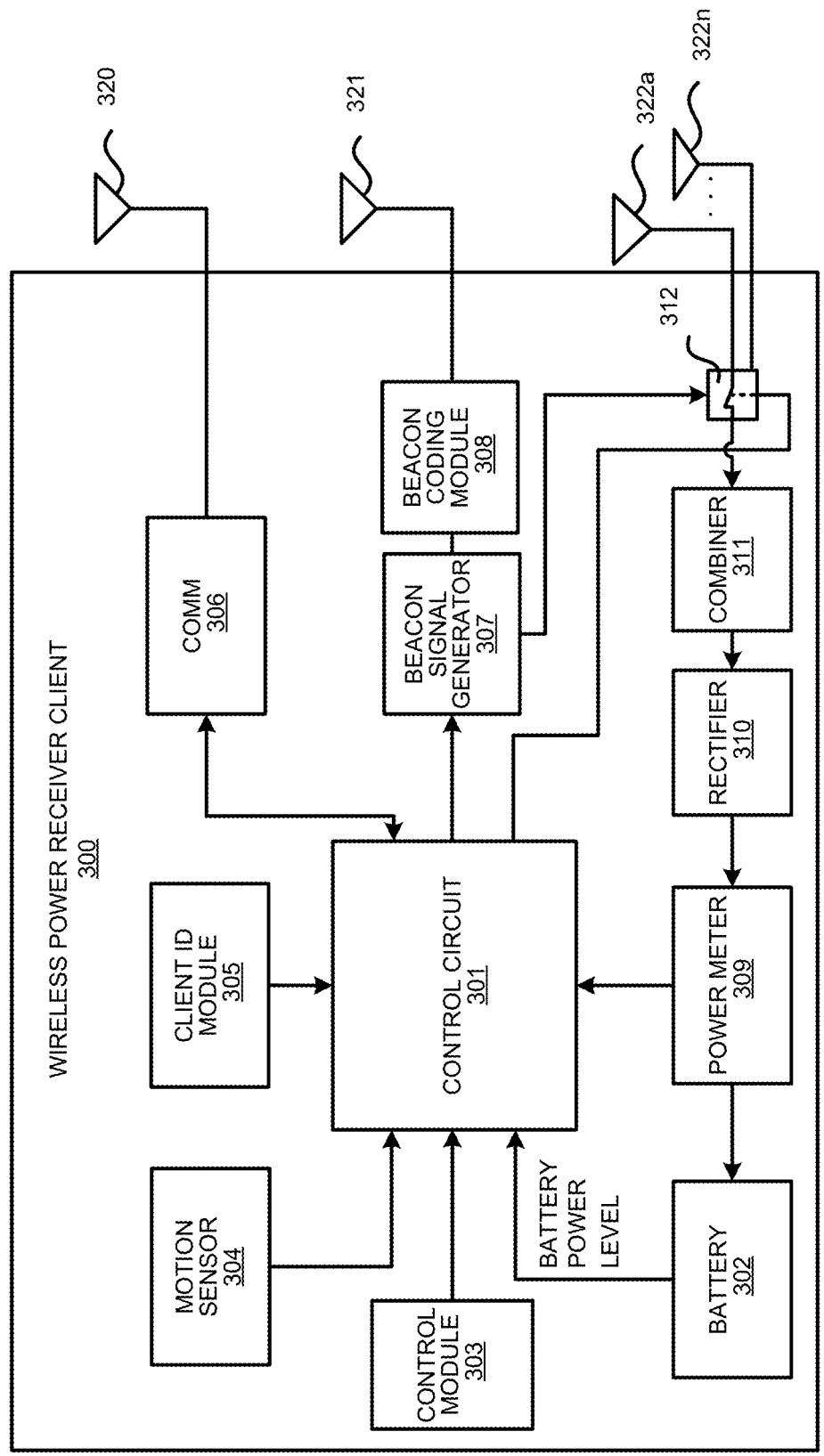
FIG. 3 is a block diagram illustrating an example embodiment of a wireless power receiver client (WPRC).

FIG. 3 is a block diagram illustrating an example WPRC 300 in accordance with embodiments described herein. As shown in the example of FIG. 3, WPRC 300 may include control circuit 301, battery 302, a control module 303, for example an Internet of Things (IoT) control module, communication block 306 and associated one or more antennas 320, power meter 309, rectifier 310, a combiner 311, beacon signal generator 307, beacon coding unit 308 and associated one or more antennas 321, and switch 312 connecting the combiner 311 or the beacon signal generator 307 to one or more associated antennas 322a-322n. The battery 302 may alternatively be replaced by a capacitor. Although not depicted, the WPRC 300 may include an energy harvesting circuit which may enable the WPRC 300 to operate with a capacitor for short term energy storage instead of or in addition to using the battery. Some or all of the depicted components in FIG. 3 can be omitted, combined, or subdivided in some embodiments. Some or all of the components depicted in FIG. 3 may be incorporated in a single integrated chip (IC). It should be noted that although the WPTS 200 may use full-duplexing, WPRC 300 may additionally or alternatively use half-duplexing. A received and/or transmitted data rate may be, for example, 20 Mbps. However, higher or lower data rates may be implemented to achieve other design goals. The WPRC 300 may transmit acknowledgement (ACK) messages back to a WPTS, such as a WPTS 200 depicted in FIG. 2. Although not depicted, a local CPU may be incorporated into WPRC 300. For example, the local CPU may be included in the control circuit 301.

A combiner 311 may receive and combine the received power and/or data transmission signals received via one or more antennas 322a-322n. The combiner can be any combiner or divider circuit that is configured to achieve isolation between output ports while maintaining a matched condition. For example, the combiner 311 can be a Wilkinson Power Divider circuit. The combiner 311 may be used to combine two or more RF signals while maintaining a characteristic impedance, for example, 50 ohms. The combiner 311 may be a resistive-type combiner, which uses resistors, or a hybrid-type combiner, which uses transformers. The rectifier 310 may receive the combined power transmission signal from the combiner 311, if present, which may be fed through the power meter 309 to the battery 302 for charging. In other embodiments, each antenna's power path can have its own rectifier 310 and the DC power out of the rectifiers is combined prior to feeding the power meter 309. The power meter 309 may measure the received power signal strength and may provide the control circuit 301 with this measurement.

Battery 302 may include protection circuitry and/or monitoring functions. Additionally, the battery 302 may include one or more features, including, but not limited to, current limiting, temperature protection, over/under voltage alerts and protection, and battery capacity monitoring, for example coulomb monitoring. The control circuit 301 may receive the battery power level from the battery 302 itself. As indicated above, although not shown, a capacitor may be substituted for the battery 302 or may be implemented in addition to the battery 302. The control circuit 301 may also transmit/receive via the communication block 306 a data signal on a data carrier frequency, such as the base signal clock for clock synchronization. The beacon signal generator 307 may generate the beacon signal or calibration signal and may transmit the beacon signal or calibration signal using one or more antennas 321.

It may be noted that, although the battery 302 is shown as charged by, and providing power to, WPRC 300, the receiver may also receive its power directly from the rectifier 310. This may be in addition to the rectifier 310 providing charging current to the battery 302, or in lieu of providing charging. Also, it may be noted that the use of multiple antennas 320, 321, and 322a-322n is one example of implementation, however the structure may be reduced to one shared antenna.

In some embodiments, the control circuit 301 and/or the control module 303 can communicate with and/or otherwise derive device information from WPRC 300. The device information can include, but is not limited to, information about the capabilities of the WPRC 300, usage information of the WPRC 300, power levels of the battery or batteries 302 of the WPRC 300, and/or information obtained or inferred by the WPRC 300. In some embodiments, a client identifier (ID) module 305 stores a client ID that can uniquely identify the WPRC 300 in a wireless power delivery environment. For example, the ID can be transmitted to one or more WPTSs in the encoded beacon signal. In some embodiments, WPRCs may also be able to receive and identify other WPRCs in a wireless power delivery environment based on the client ID.

A motion sensor 304 can detect motion and may signal the control circuit 301 to act accordingly. For example, a device receiving power may integrate motion detection mechanisms such as accelerometers or equivalent mechanisms to detect motion. Once the device detects that it is in motion, it may be assumed that it is being handled by a user, and may trigger a signal to the antenna array of the WPTS to either stop transmitting power and/or data, or to initiate wireless power and/or data transmission from the WPTS. The WPRC may use the encoded beacon or other signaling to communicate with the WPTS. In some embodiments, when a WPRC 300 is used in a moving environment like a car, train or plane, the power might only be transmitted intermittently or at a reduced level unless the WPRC 300 is critically low on power.

Figure 4:
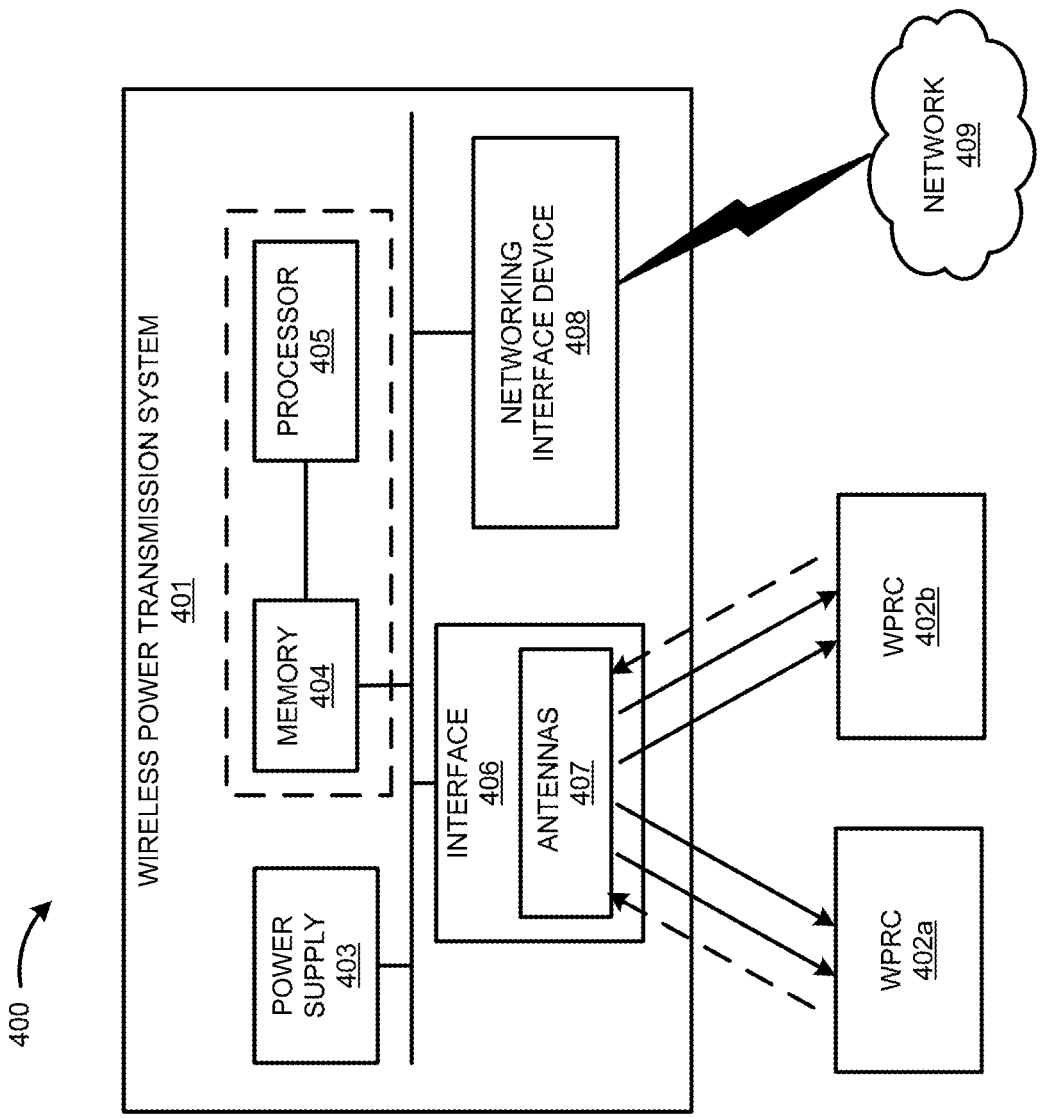
FIG. 4 is a diagram illustrating an example embodiment of a wireless signal delivery environment.

FIG. 4 is a diagram illustrating an example wireless signal delivery environment 400 in accordance with embodiments described herein. The wireless signal delivery environment 400 includes WPTS 401, a user operating WPRCs 402a and 402b, and wireless network 409. Although two WPRCs are depicted in FIG. 4, any number of WPRCs may be supported. WPTS 401 as depicted in FIG. 4 can alternatively be implemented in accordance with WPTS 101 as depicted in FIG. 1. Alternative configurations are also possible. Likewise, WPRCs 402a and 402b as depicted in FIG. 4 can be implemented in accordance with WPRCs 110a-110c of FIG. 1, or can be implemented in accordance with WPRC 300 as depicted in FIG. 3, although alternative configurations are also possible.

WPTS 401 may include a power supply 403, memory 404, processor 405, interface 406, one or more antennas 407, and a networking interface device 408. Some or all of the components of the WPTS 401 can be omitted, combined, or sub-divided in some embodiments. The networking interface device may communicate wired or wirelessly with a network 409 to exchange information that may ultimately be communicated to or from WPRCs 402a and 402b. The one or more antennas 407 may also include one or more receivers, transmitters, and/or transceivers. The one or more antennas 407 may have a radiation and reception pattern directed in a space proximate to WPRC 402a, WPRC 402b, or both, as appropriate. WPTS 401 may transmit a wireless power signal, wireless data signal, or both over at least a portion of antennas 407 to WPRCs 402a and 402b. As discussed herein, WPTS 401 may transmit the wireless power signal, wireless data signal, or both at an angle in the direction of WPRCs 402a and 402b such that the strength of the respectively received wireless signal by WPRCs 402a and 402b depends on the accuracy of the directivity of the corresponding directed transmission beams from at least a portion of antennas 407.

A fundamental property of antennas is that the receiving pattern of an antenna when used for receiving is directly related to the far-field radiation pattern of the antenna when used for transmitting. This is a consequence of the reciprocity theorem in electromagnetics. The radiation pattern can be any number of shapes and strengths depending on the directivity of the beam created by the waveform characteristics and the types of antennas used in the antenna design of the antennas 407. The types of antennas 407 may include, for example, horn antennas, simple vertical antenna, etc. The antenna radiation pattern can comprise any number of different antenna radiation patterns, including various directive patterns, in a wireless signal delivery environment 400. By way of example and not limitation, wireless power transmit characteristics can include phase settings for each antenna and/or transceiver, transmission power settings for each antenna and/or transceiver, or any combination of groups of antennas and transceivers, etc.

As described herein, the WPTS 401 may determine wireless communication transmit characteristics such that, once the antennas and/or transceivers are configured, the multiple antennas and/or transceivers are operable to transmit a wireless power signal and/or wireless data signal that matches the WPRC radiation pattern in the space proximate to the WPRC. Advantageously, as discussed herein, the wireless signal, including a power signal, data signal, or both, may be adjusted to more accurately direct the beam of the wireless signal toward a location of a respective WPRC, such as WPRCs 402a and 402b as depicted in FIG. 4.

The directivity of the radiation pattern shown in the example of FIG. 4 is illustrated for simplicity. It is appreciated that any number of paths can be utilized for transmitting the wireless signal to WPRCs 402*a* and 402*b* depending on, among other factors, reflective and absorptive objects in the wireless communication delivery environment. FIG. 4 depicts direct signal paths, however other signal paths, including multi-path signals, that are not direct are also possible.

The positioning and repositioning of WPRCs 402*a* and 402*b* in the wireless communication delivery environment may be tracked by WPTS 401 using a three-dimensional angle of incidence of an RF signal at any polarity paired with a distance that may be determined by using an RF signal strength or any other method. As discussed herein, an array of antennas 407 capable of measuring phase may be used to detect a wave-front angle of incidence. A respective angle of direction toward WPRCs 402*a* and 402*b* may be determined based on respective distance to WPRCs 402*a* and 402*b* and on respective power calculations. Alternatively, or additionally, the respective angle of direction to WPRCs 402*a* and 402*b* can be determined from multiple antenna array segments 407.

In some embodiments, the degree of accuracy in determining the respective angle of direction toward WPRCs 402*a* and 402*b* may depend on the size and number of antennas 407, number of phase steps, method of phase detection, accuracy of distance measurement method, RF noise level in environment, etc. In some embodiments, users may be asked to agree to a privacy policy defined by an administrator for tracking their location and movements within the environment. Furthermore, in some embodiments, the system can use the location information to modify the flow of information between devices and optimize the environment. Additionally, the system can track historical wireless device location information and develop movement pattern information, profile information, and preference information.

Figure 5:
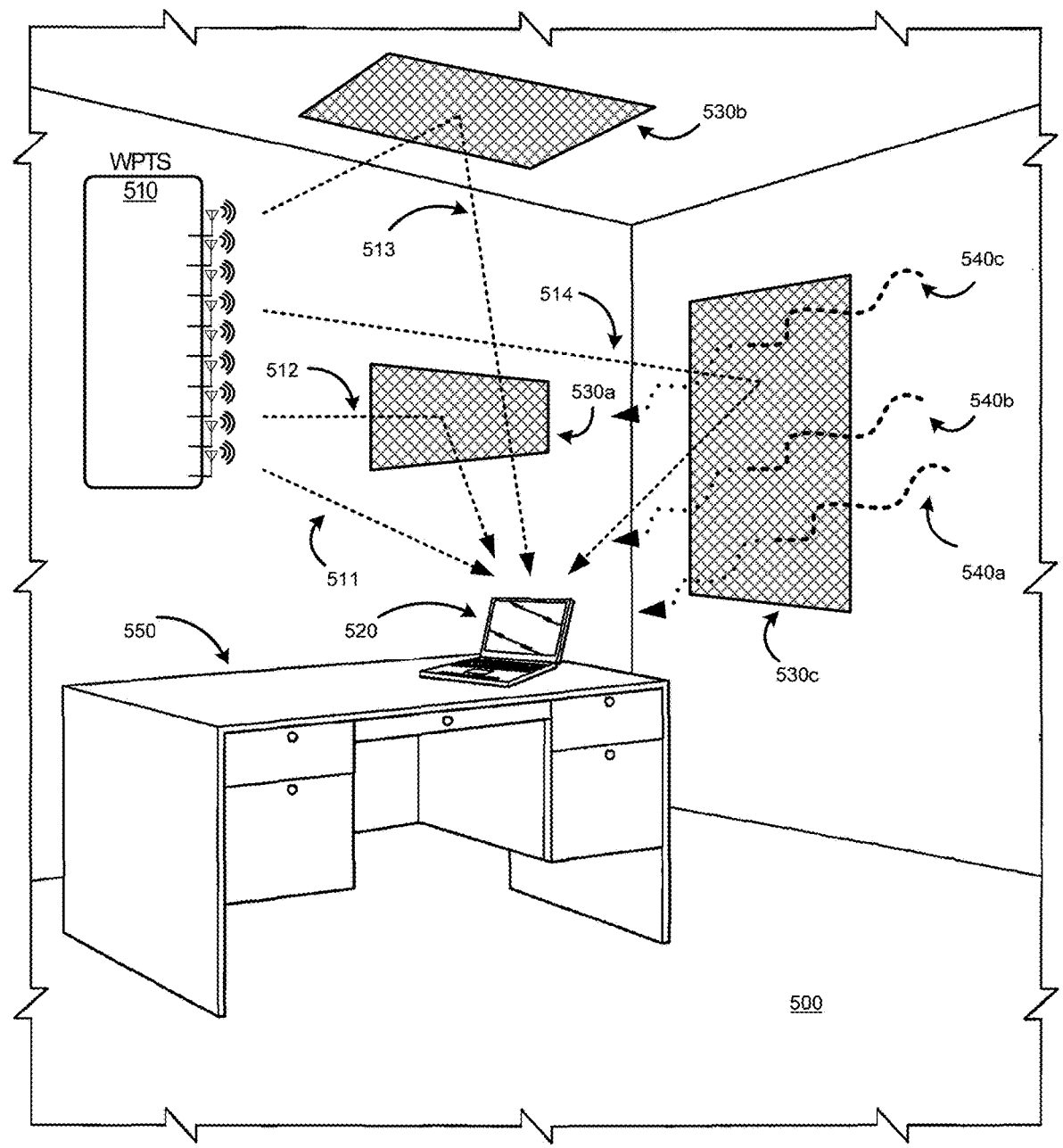
FIG. 5 depicts an example embodiment of a wireless environment including at least one conformal wave selector.

FIG. 5 depicts an example of a wireless environment 500 including a WPTS 510, a WPRC 520, and three conformal wave selectors 530*a*, 530*b*, and 530*c*. As depicted in FIG. 5, a WPTS 510 may transmit multiple multipath wireless signals, for example 511, 512, 513, and 514, which may be either directly transmitted to WPRC 520, or may reflect off of a conformal wave selector 530*a*, 530*b*, or 530*c* to focus a wireless signal on the WPRC 520. Although not depicted, the WPTS 510 may also transmit signals that reflect off of surfaces that are not covered by a conformal wave selector. The WPTS 510 is an example of any wireless RF system that may be used in conjunction with conformal wave selectors to select RF waves for improved reflection. The depiction of WPTS 510 is not meant to be limiting.

Although the conformal wave selectors 530*a*, 530*b*, and 530*c* are all depicted in FIG. 5 with a grid pattern, the illustrated pattern is merely meant to aid the reader in identifying the conformal wave selectors and is not meant to be limiting on the structure of the conformal wave selectors. Furthermore, the particular size, shape, location, and arrangement of the conformal wave selectors are not meant to be limiting and depict just one example combination of any combination of sizes, shapes, locations, and arrangements that may be implemented and fall within the scope of the embodiments described herein. Furthermore, the number of conformal wave selectors used may be more or less than three. A conformal wave selector may also be made up of multiple individual conformal wave selectors, or conversely a portion of a conformal wave selector may itself be viewed as a conformal wave selector. A conformal wave selector may conform to any surface, and as such a conformal wave selector such as any of 530*a*, 530*b*, or 530*c* need not cover a single flat surface as depicted in FIG. 5. For example, a conformal wave selector may overlap a corner of a wall and extend onto the ceiling, or a conformal wave selector may overlap a corner between two walls, or a conformal wave selector may overlap a corner where two walls and the ceiling meet. Although not depicted in FIG. 5, a conformal wave selector may also be adhered to a floor or a window. As another example, a conformal wave selector may also be adhered to a surface that is not a wall, ceiling, floor, or window. For example, a conformal wave selector may be adhered to an object within the room, such as the desk 550. Although not shown in FIG. 5, a WPTS 510 may directionally transmit a wave such that it reflects off of more than one conformal wave selector before focusing on a location of the WPRC 520. Any of the embodiments depicted in any of the Figures herein are not meant to be limiting on any of the features of the conformal wave selectors as explained above with respect to FIG. 5.

As depicted in FIG. 5, RF waves such as RF waves 540*a*, 540*b*, and 540*c* may penetrate a conformal wave selector, allowing RF waves from another wireless system to enter the room. For example, Wi-Fi signals from a wireless router outside of the room may penetrate conformal wave selector 530*c* so that they may be received by WPRC 520, which may be a laptop, for example.

Figure 6:
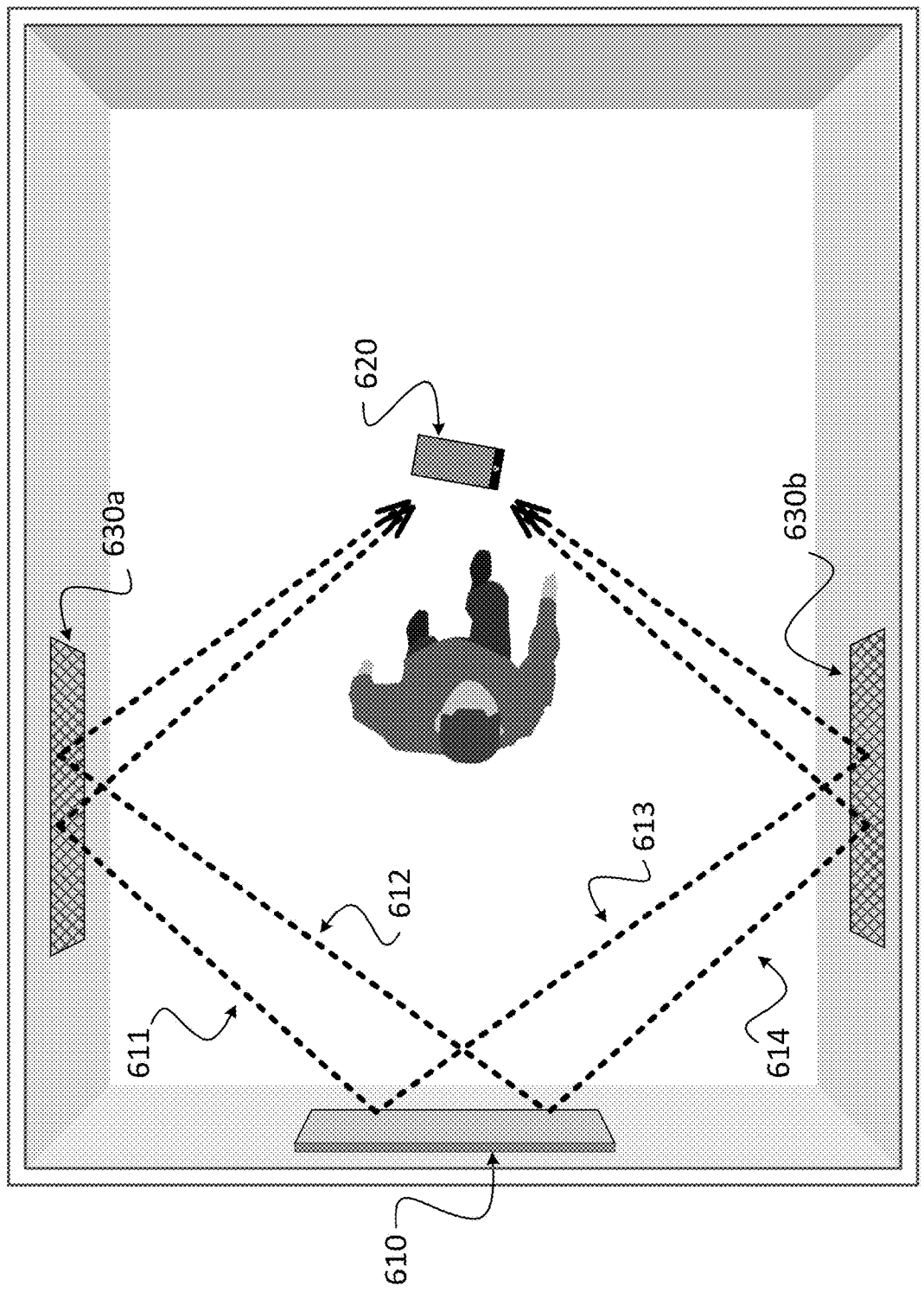
FIG. 6 depicts another example embodiment of a wireless environment including at least one conformal wave selector.

FIG. 6 depicts another example embodiment of a wireless environment 600 including a wireless transmitter, for example a WPTS 610, and a wireless receiver, for example a WPRC 620. The wireless environment 600 may include conformal wave selectors 630*a* and 630*b*. In the example embodiment depicted in FIG. 6, a WPTS 610 may transmit wireless signals 611, 612, 613, and 614. The wireless signals 611, 612, 613, and 614 may be directionally transmitted to reflect off of at least one of conformal wave selectors 630*a* and/or 630*b*. In the example embodiment depicted in FIG. 6, a person may be blocking a direct line of sight transmission from the WPTS 610 to the WPRC 620. In such a scenario, the WPTS 610 may determine transmission phase angles from its multiple antennas (not shown) so that wireless signals are bounced off of the conformal wave selectors 630*a* and 630*b* so that an improved signal level is focused at a location of the WPRC 620. Without the conformal wave selectors 630*a* and 630*b*, walls may absorb much more of the power of the wireless signals 611, 612, 613, and 614, and thus less signal power may be focused at the location of the WPRC 620. In some embodiments, a WPTS 610 may measure optimum locations for conformal wave selectors and provide the location information for optimal placement.

A conformal wave selector may be a wallpaper, a paint, a colloid, or any other material that does not need to be flat, but may conform to the surface to which is it applied. A conductive pattern may be printed onto a wallpaper or woven within the wallpaper and may be used to implement an embodiment of a conformal wave selector. Another embodiment of a conformal wave selector may be implemented by painting a conductive paint onto a surface into a pattern suitable for a conformal wave selector. Details of patterns will be set forth in detail below. In one embodiment, a mask may be used to apply the conductive paint in a pattern. In another embodiment, a colloid carrying conductive thread may be used to implement a conformal wave selector. In another embodiment, a chemical may be applied to a surface. The chemical may be cured by, for example, a light source. A mask may be used to apply the chemical and/or the light source. In yet another embodiment, a combination of the methods of construction set forth above may be used. For example, a colloid may be used in conjunction with a conductive paint.

In the following example embodiments and corresponding Figures of patterns for a conformal wave selector, regularly spaced and sized dimensions are depicted and described. However, it is not necessary that the dimensions, shapes, orientations, etc. are perfectly uniform. Variation is acceptable in the formation of the patterns. Thus, when sizes, dimensions, orientations, etc. are described herein, the relationships between the involved components and the sizes thereof need only be substantially similar to that described.

In general a substantially equal distribution of conductors in a first direction and conductors in a second direction that is normal to the first direction may be used. In doing so, an example of a conformal wave selector may partially allow RF signals to penetrate the conformal wave selector so that the RF signals may enter or escape a room in which the conformal wave selector is installed. In this example, the conformal wave selector may also reflect RF signals used inside the room, and thus may enhance a transmission path for delivering increased signal power to a location of interest.

An embodiment of a conformal wave selector may comprise one or more regions that may act as polarization filters that permit the penetration or reflection of certain polarization components of radio frequency waves. A region may include conductors, such as linear strips of conductive material, which may be aligned collectively along a same direction. A wave, for example an RF signal, with a polarization that is aligned with the conductors may be blocked by the conductors. The length of the conductors may be selected to be longer than a maximum wavelength of an RF signal that is meant to be reflected by the conformal wave selector. For example, the length may be significantly longer than the maximum wavelength of the RF signal that is meant to be reflected. More specifically, for example, the length may be at least four times longer than the maximum wavelength of the RF signal that is meant to be reflected. A wave normal to the direction of the conductors' axes may be effectively blind to the conductors since currents normal to the conductor may be permitted.

The width of the conductors may be shorter than a minimum wavelength that may be intended to penetrate through the conformal wave selector. In one embodiment, the width of the conductors may be significantly shorter than the minimum wavelength that may be intended to penetrate. More specifically, the width of the conductors may be ten times shorter than the minimum wavelength that may be intended to penetrate. A "width/pitch" ratio may be kept sufficiently low such that a capacitive coupling between the conductors may not create an effective surface conductivity that may interfere with a wave polarized normal to the direction of the length of the conductor. A pitch may be a measure of how far apart adjacent conductors are spaced, such that a width/pitch ratio may define what percentage of a span in a direction running normal to the conductors is attributed to the width of conductors compared to the overall span of distance across the normal direction. The width/pitch ratio will be further described in connection with the following embodiments and Figures.

An orientation of conductors in different regions may be varied to allow waves of a diverse set of polarizations to penetrate and/or reflect. A wave's polarization may not fall perfectly parallel with the orientation of conductors in a particular region. However, a wave's polarization can be broken into equivalent components that do fall parallel to the orientation of the conductors in the different regions, such that one component is parallel to a first orientation of conductors in a first region, and another component is parallel to a second orientation of conductors in a second region, wherein the first orientation is normal to the second orientation. Thus, a component of a wave polarized in a parallel orientation in the first region will be reflected, whereas the same component of the wave may penetrate the second region because its polarization is normal to the orientation of the conductors in the second region. Because a particular polarization of waves is not known, a conformal wave selector arranged in accordance with regions as described herein will allow for waves of diverse polarizations to reflect and to penetrate. In one example, substantially half of a power of a wireless RF signal with a maximum wavelength no longer than the length of the conductors may penetrate the conformal wave selector.

An embodiment of a conformal wave selector may comprise a plurality of layers of conductors. The plurality of layers of conductors may be connected. A position of an interconnect connecting a first layer of the plurality of layers to a second layer of the plurality of layers may vary. In one embodiment, the plurality of layers may be layered such that a conductors oriented in different directions in respective layers do not overlap.

Figure 7:
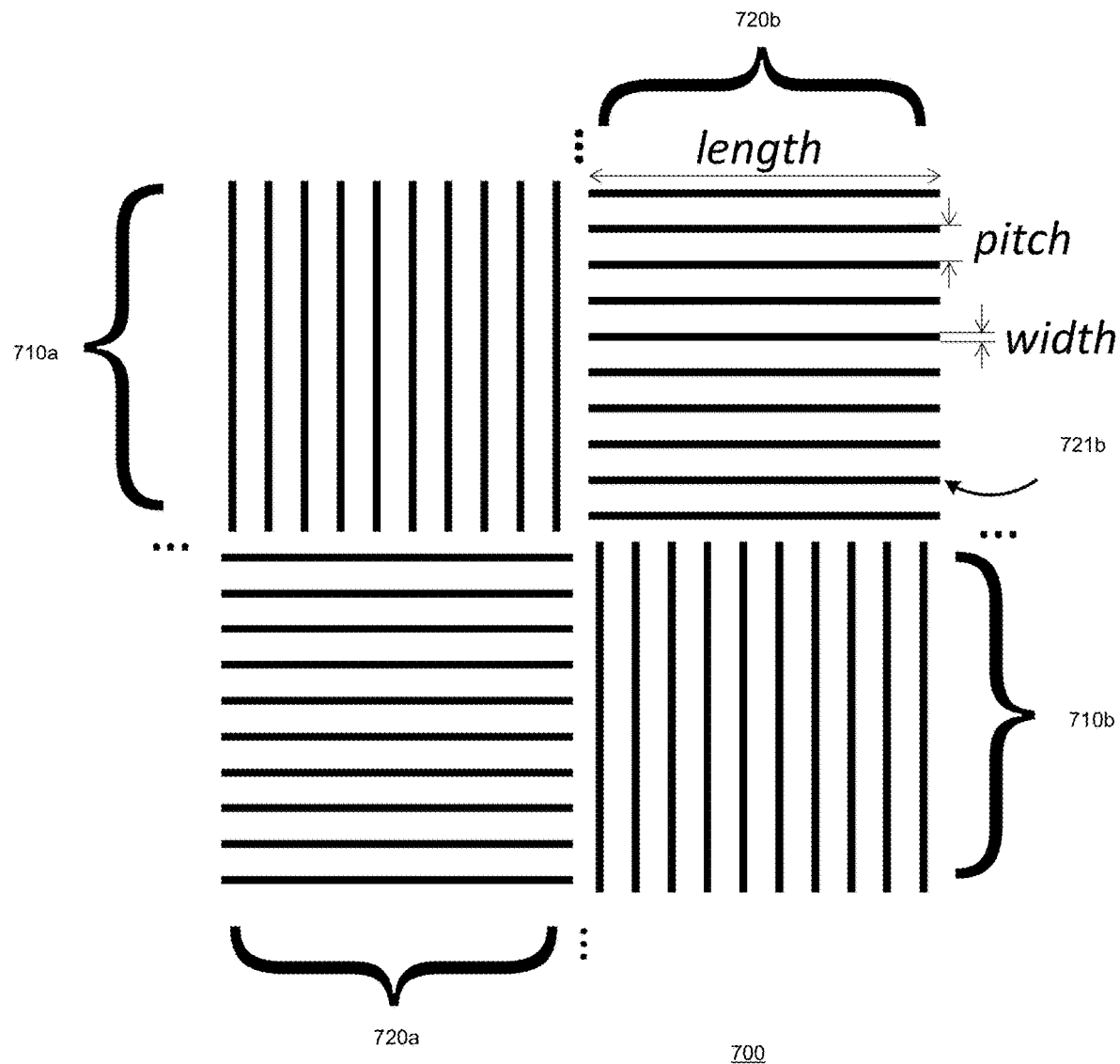
FIG. 7 depicts an example embodiment of a pattern of conductors for a conformal wave selector.

FIG. 7 depicts an example embodiment of a pattern of conductors for a conformal wave selector 700. A first region 720b may include a first set of parallel conductors, such as conductor 721b, having a length, width, and pitch as depicted. The first set of parallel conductors of the first region 720b may all be oriented in a direction of a first axis. Another region 720a may also include a set of parallel conductors of a length, width, and pitch that may be substantially similar to the first set of parallel conductors. In another embodiment, the set of parallel conductors in region 720a may have a different length, width, and pitch than the first set of parallel conductors. The set of parallel conductors in region 720a may also be oriented substantially in the direction of the first axis. In another embodiment, the set of parallel conductors in region 720a may be oriented in a different direction than the first set of parallel conductors. A second region 710a may include a second set of parallel conductors of a length, width, and pitch that may be substantially similar to the first set of parallel conductors. In another embodiment, the length, width, and pitch of the second set may be different than the first set. The orientation of the second set of parallel conductors may be in a direction of a second axis that is substantially normal to the first axis. In another embodiment, the orientation of the second set of parallel conductors may be in a different direction than the second axis. Another region 710b may also include a set of parallel conductors of a length, width, and pitch that may be substantially similar to the second set of parallel conductors. In another embodiment, the set of parallel conductors in region 710b may have a different length, width, and pitch than the second set of parallel conductors. The set of parallel conductors in region 710b may also be oriented substantially in the direction of the second axis. In another embodiment, the set of parallel conductors in region 710b may be oriented in a different direction than the second set of parallel conductors. As shown in FIG. 7, conductors oriented in directions normal to each other may not overlap. In some embodiments, a number of conductors of the first set may be substantially the same as a number of conductors in the second set. In other embodiments, the number of conductors of the first set may be different than the number of conductors of the second set. In some embodiments, a size of the first region 720*b* may be substantially the same size as the second region 710*a*. In other embodiments, the sizes of the regions may be different.

Figure 8:
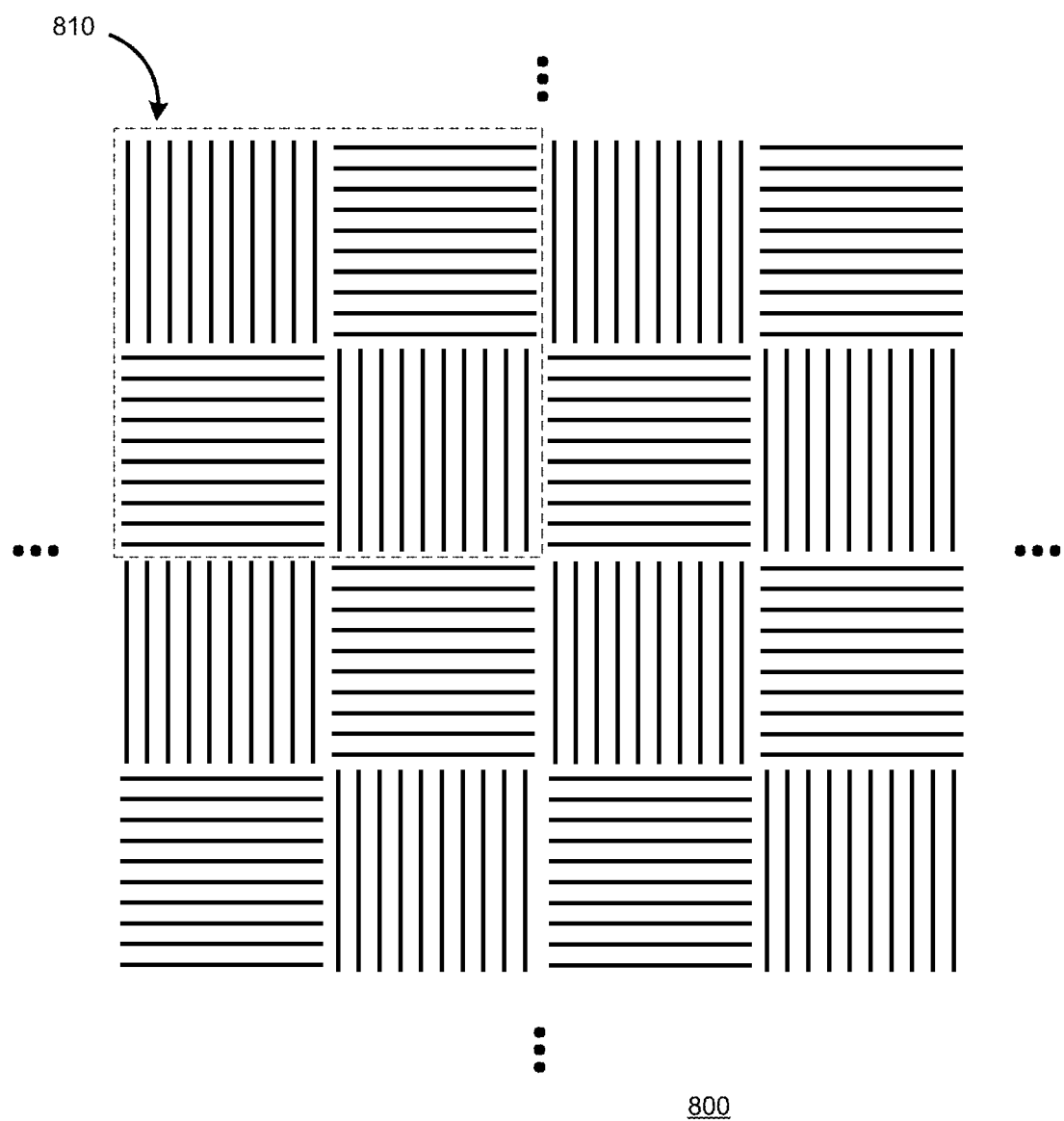
FIG. 8 depicts another example embodiment of a pattern of conductors for a conformal wave selector.

As discussed above, although the pattern of conductors for a conformal wave selector 700 depicted in FIG. 7 is very uniform and regular, this should not be viewed as limiting. Variation is acceptable in the formation of the pattern. The pattern of conductors for a conformal wave selector 700 as depicted in FIG. 7 may repeat in adjacent regions as is depicted in FIG. 8. As discussed above, a substantially equal distribution of conductors oriented in the direction of the first axis and in the direction of the second axis may be used so that the conformal wave selector does not reflect or allow to penetrate waves polarized in the direction of one of the axes more than the other axis.

FIG. 8 depicts another example embodiment of a pattern of conductors for a conformal wave selector 800. Region 810 corresponds to pattern 700 of FIG. 7. As seen in FIG. 8, region 810 may be regularly repeated in each direction. The dashed lines depicted around region 810 are meant to aid illustration only and are not conductors. The ellipses depicted in FIG. 8 are also meant to aid in illustration only and to signify that the pattern may continue in any direction. The ellipses are not conductors. As discussed above, a substantially equal distribution of conductors oriented in the direction of the first axis and in the direction of the second axis may be used so that the conformal wave selector does not reflect or allow to penetrate waves polarized in the direction of one of the axes more than the other axis. As depicted in FIG. 8, a plurality of sets of parallel conductors may be arranged in a grid in an alternating fashion, such that conductors oriented in a first direction may occupy alternating regions of the grid in a first axis of the grid and may also occupy alternating regions of the grid in a second axis of the grid that is normal to the first axis of the grid. Conductors oriented in a direction normal to the first direction may occupy alternating regions of the grid in the first and second axis of the grid that are different than the alternating regions occupied by the conductors oriented in the first direction. In some embodiments, the alternating arrangement of the various sets of parallel conductors may form a checkered pattern across the surface, as depicted in FIG. 8. The particular pattern in which the regions are repeated in FIG. 8 should not be viewed as limiting and should only serve as an example. Other patterns are also possible.

Figure 9:
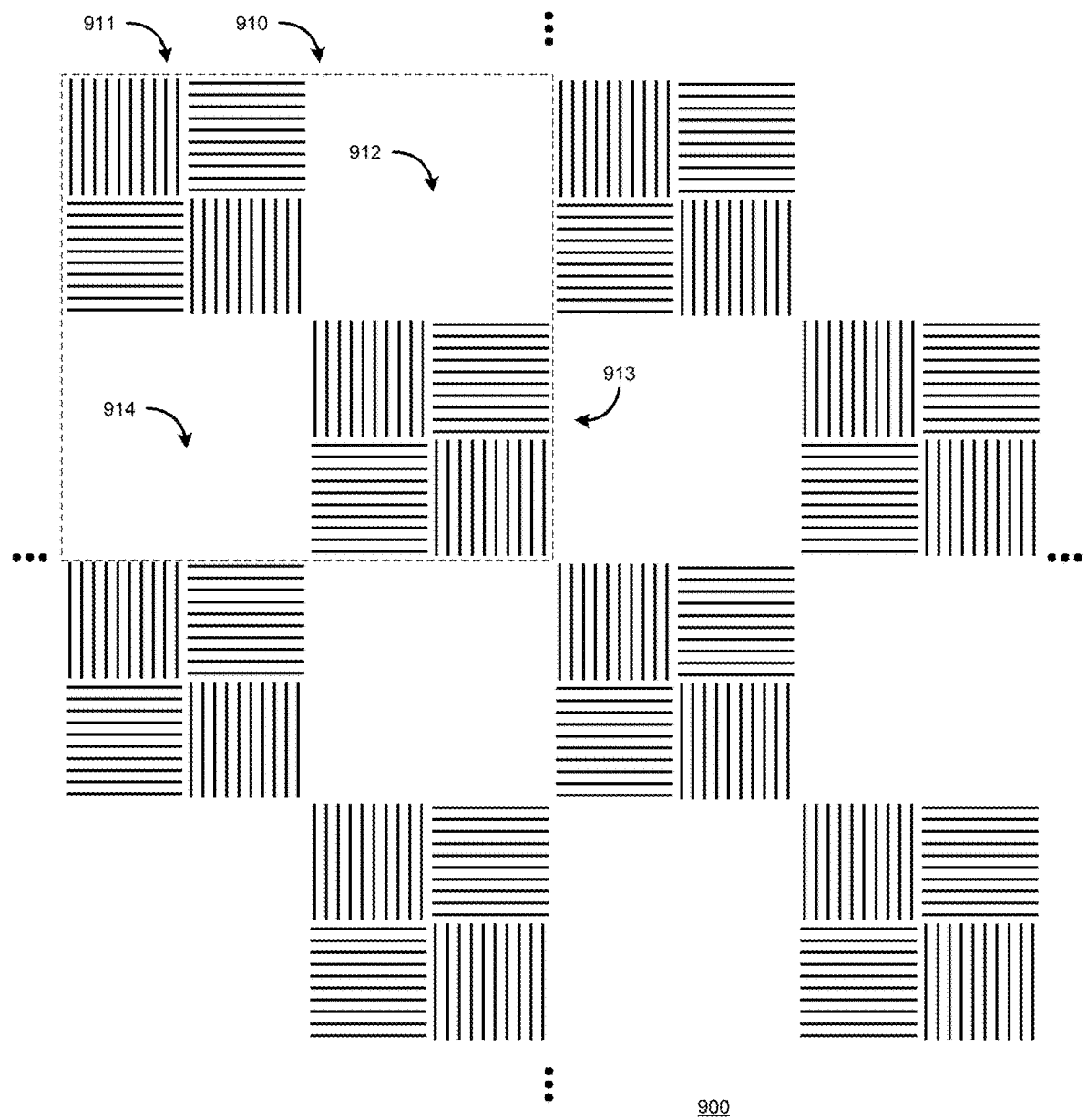
FIG. 9 depicts another example embodiment of a pattern of conductors for a conformal wave selector.

FIG. 9 depicts another example embodiment of a pattern of conductors for a conformal wave selector 900. Region 910 may include subregions 911, 912, 913 and 914. Subregions 911 and 913 may include conductors arranged as depicted in FIG. 9 or additionally or alternatively in accordance with the patterns or regions depicted in, for example, FIG. 7, 8, or 12. Subregions 912 and 914 may not contain any conductors. As seen in FIG. 9, region 910 may be regularly repeated in each direction. The dashed lines depicted around region 910 are meant to aid illustration only and are not conductors. The ellipses depicted in FIG. 9 are also meant to aid in illustration only and to signify that the pattern may continue in any direction. The ellipses are not conductors. As discussed above, a substantially equal distribution of conductors oriented in the direction of the first axis and in the direction of the second axis may be used so that the conformal wave selector does not reflect or allow to penetrate waves polarized in the direction of one of the axes more than the other axis. The particular pattern in which the regions are repeated in FIG. 9 should not be viewed as limiting and should only serve as an example. Other patterns are also possible.

Figure 10:
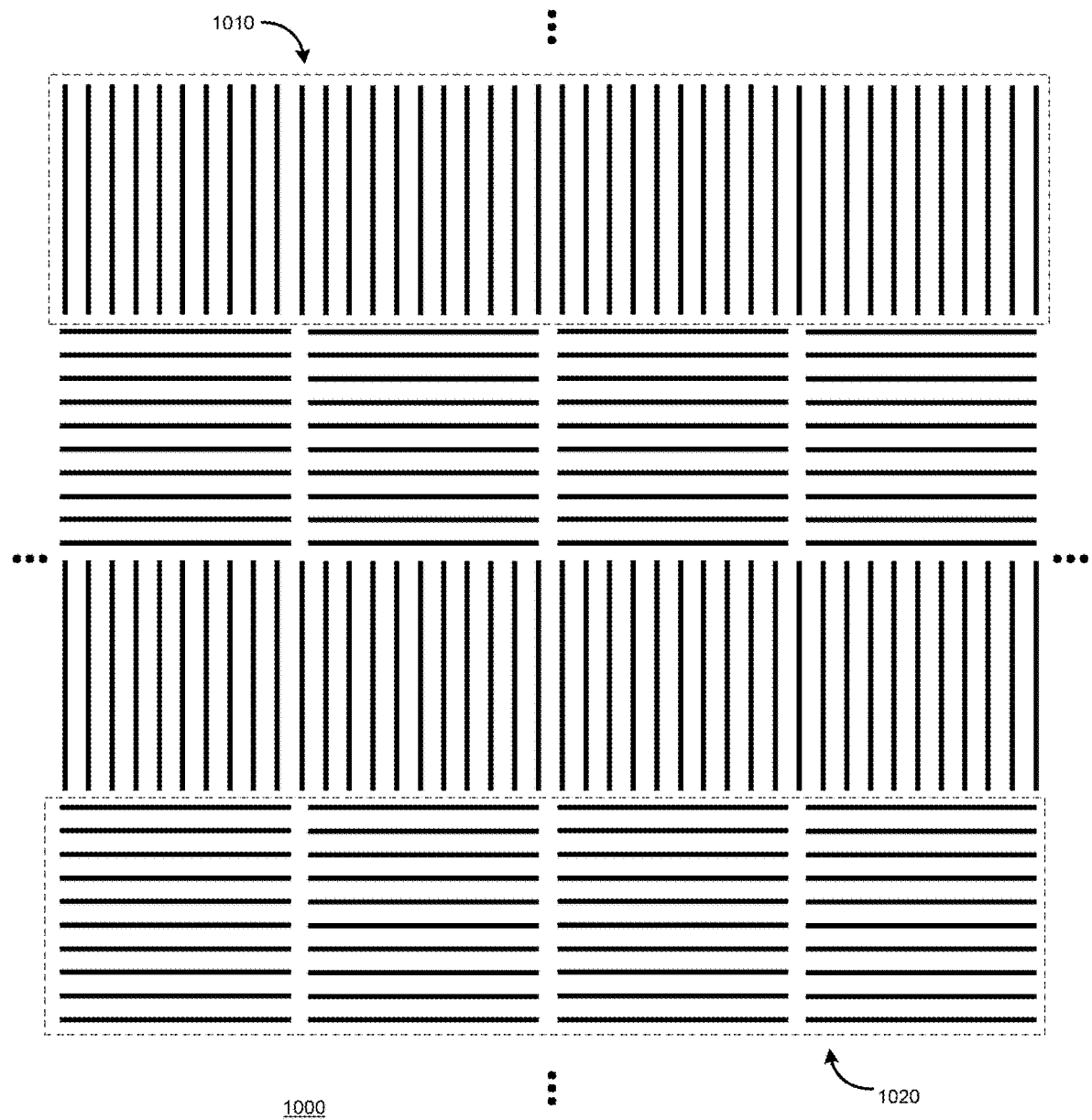
FIG. 10 depicts another example embodiment of a pattern of conductors for a conformal wave selector.

FIG. 10 depicts another example embodiment of a pattern of conductors for a conformal wave selector 1000. Region 1010 may include conductors all arranged in a direction of a first axis. Region 1020 may include conductors all arranged in a direction of a second axis that is normal to the first axis. As seen in FIG. 10, regions 1010 and 1020 may be regularly repeated in each direction. Although the regions 1010 and 1020 are depicted to alternate vertically in FIG. 10, several regions 1010, for example, may be repeated followed by several regions of 1020. The dashed lines depicted around regions 1010 and 1020 are meant to aid illustration only and are not conductors. The ellipses depicted in FIG. 10 are also meant to aid in illustration only and to signify that the pattern may continue in any direction. The ellipses are not conductors. As discussed above, a substantially equal distribution of conductors oriented in the direction of the first axis and in the direction of the second axis may be used so that the conformal wave selector does not reflect or allow to penetrate waves polarized in the direction of one of the axes more than the other axis. The particular pattern in which the regions are repeated in FIG. 10 should not be viewed as limiting and should only serve as an example. Other patterns are also possible.

Figure 11:
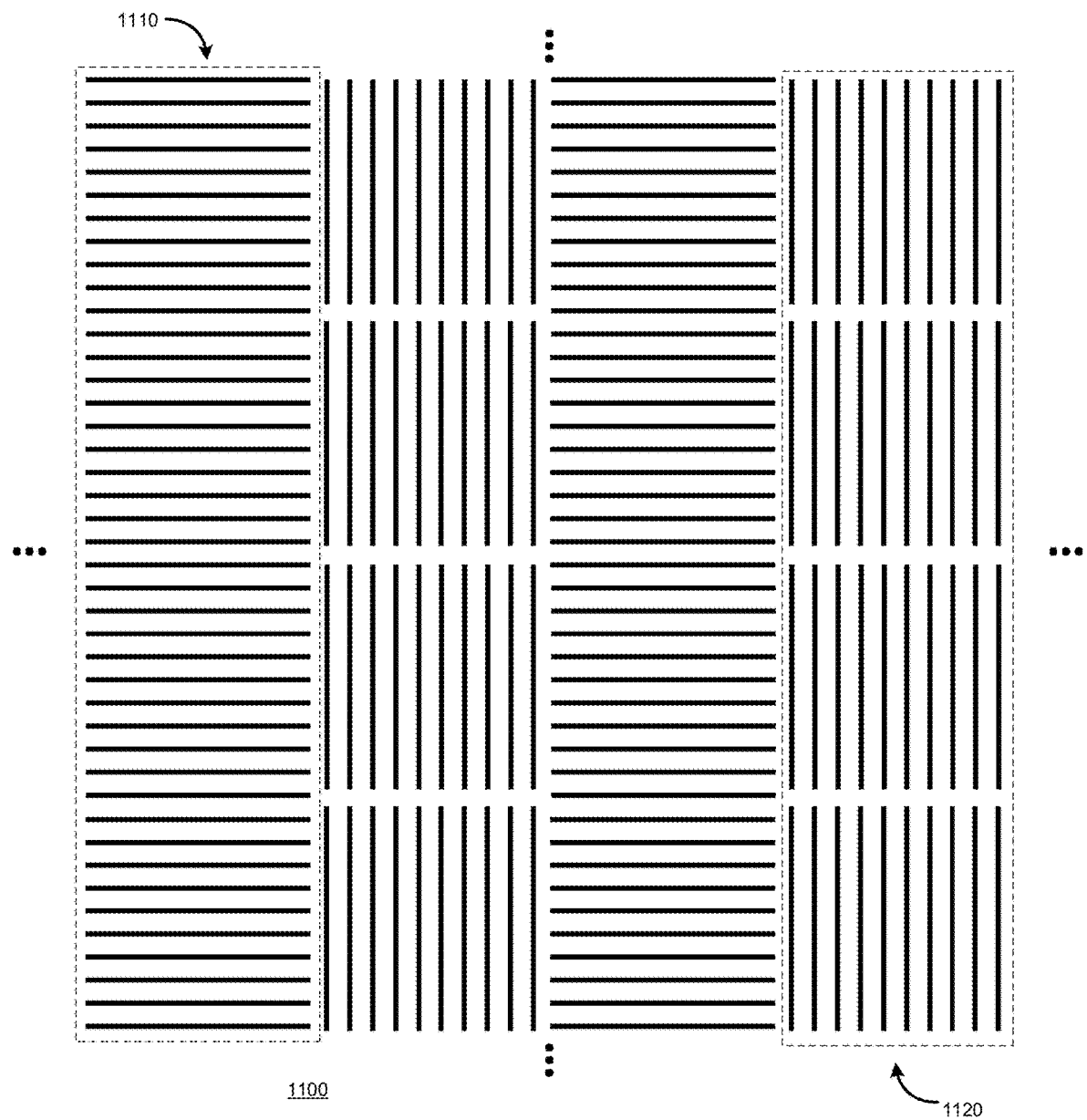
FIG. 11 depicts another example embodiment of a pattern of conductors for a conformal wave selector.

FIG. 11 depicts another example embodiment of a pattern of conductors for a conformal wave selector 1100. Region 1110 may include conductors all arranged in a direction of a first axis. Region 1120 may include conductors all arranged in a direction of a second axis that is normal to the first axis. As seen in FIG. 11, regions 1110 and 1120 may be regularly repeated in each direction. Although the regions 1110 and 1120 are depicted to alternate horizontally in FIG. 11, several regions 1110, for example, may be repeated followed by several regions of 1120. The dashed lines depicted around regions 1110 and 1120 are meant to aid illustration only and are not conductors. The ellipses depicted in FIG. 11 are also meant to aid in illustration only and to signify that the pattern may continue in any direction. The ellipses are not conductors. As discussed above, a substantially equal distribution of conductors oriented in the direction of the first axis and in the direction of the second axis may be used so that the conformal wave selector does not reflect or allow to penetrate waves polarized in the direction of one of the axes more than the other axis. The particular pattern in which the regions are repeated in FIG. 11 should not be viewed as limiting and should only serve as an example. Other patterns are also possible.

Figure 12:
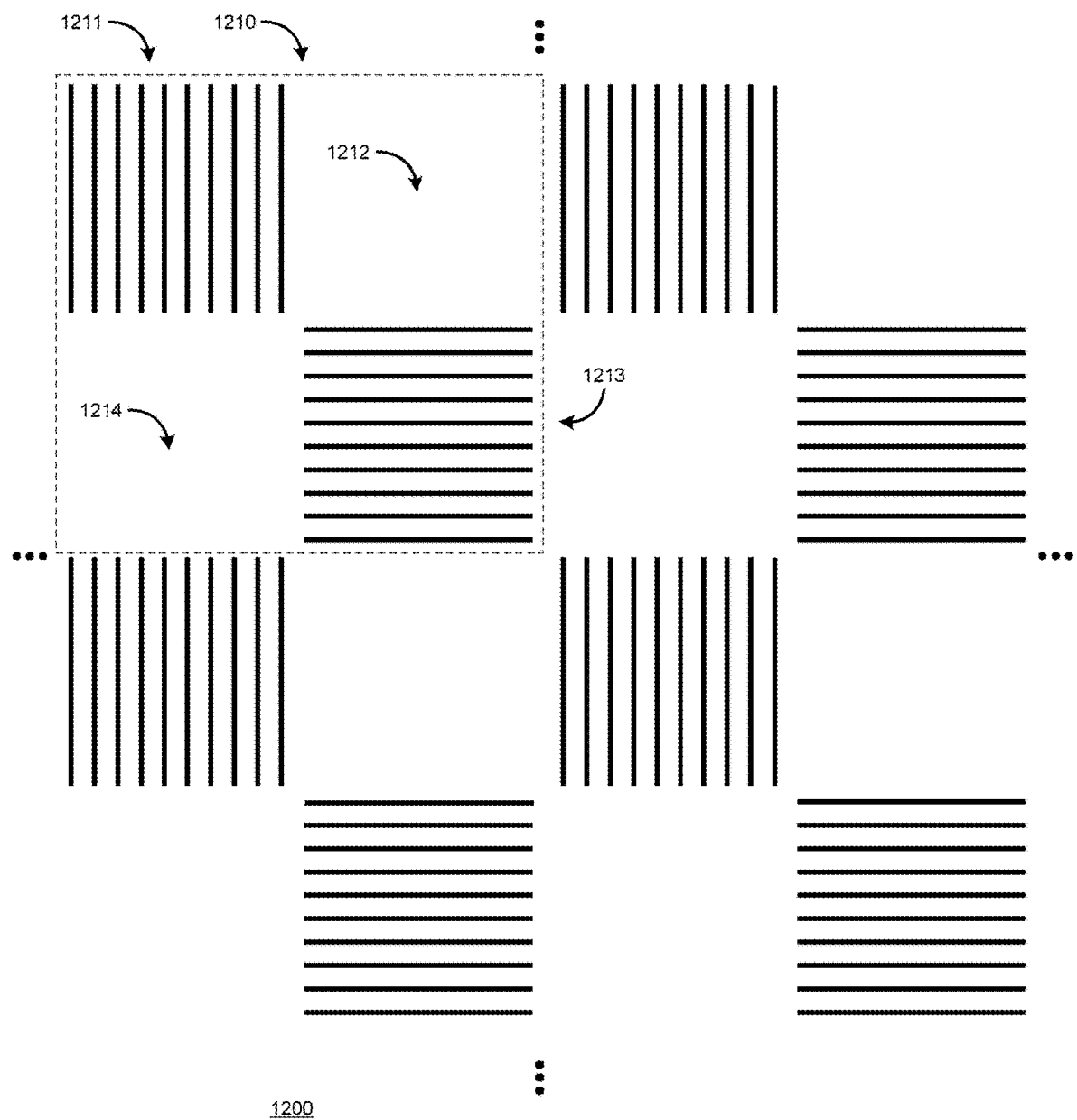
FIG. 12 depicts another example embodiment of a pattern of conductors for a conformal wave selector.

FIG. 12 depicts another example embodiment of a pattern of conductors for a conformal wave selector 1200. Region 1210 may include subregions 1211, 1212, 1213 and 1214. Subregions 1211 and 1213 may include conductors arranged as depicted in FIG. 12 or additionally or alternatively in accordance with the patterns or regions depicted in, for example, FIG. 7, 8, or 9. Subregions 1212 and 1214 may not contain conductors. As seen in FIG. 12, region 1210 may be regularly repeated in each direction. The dashed lines depicted around region 1210 are meant to aid illustration only and are not conductors. The ellipses depicted in FIG. 12 are also meant to aid in illustration only and to signify that the pattern may continue in any direction. The ellipses are not conductors. As discussed above, a substantially equal distribution of conductors oriented in the direction of the first axis and in the direction of the second axis may be used so that the conformal wave selector does not reflect or allow to penetrate waves polarized in the direction of one of the axes more than the other axis. The particular pattern in which the regions are repeated in FIG. 12 should not be viewed as limiting and should only serve as an example. Other patterns are also possible.

Figure 13:
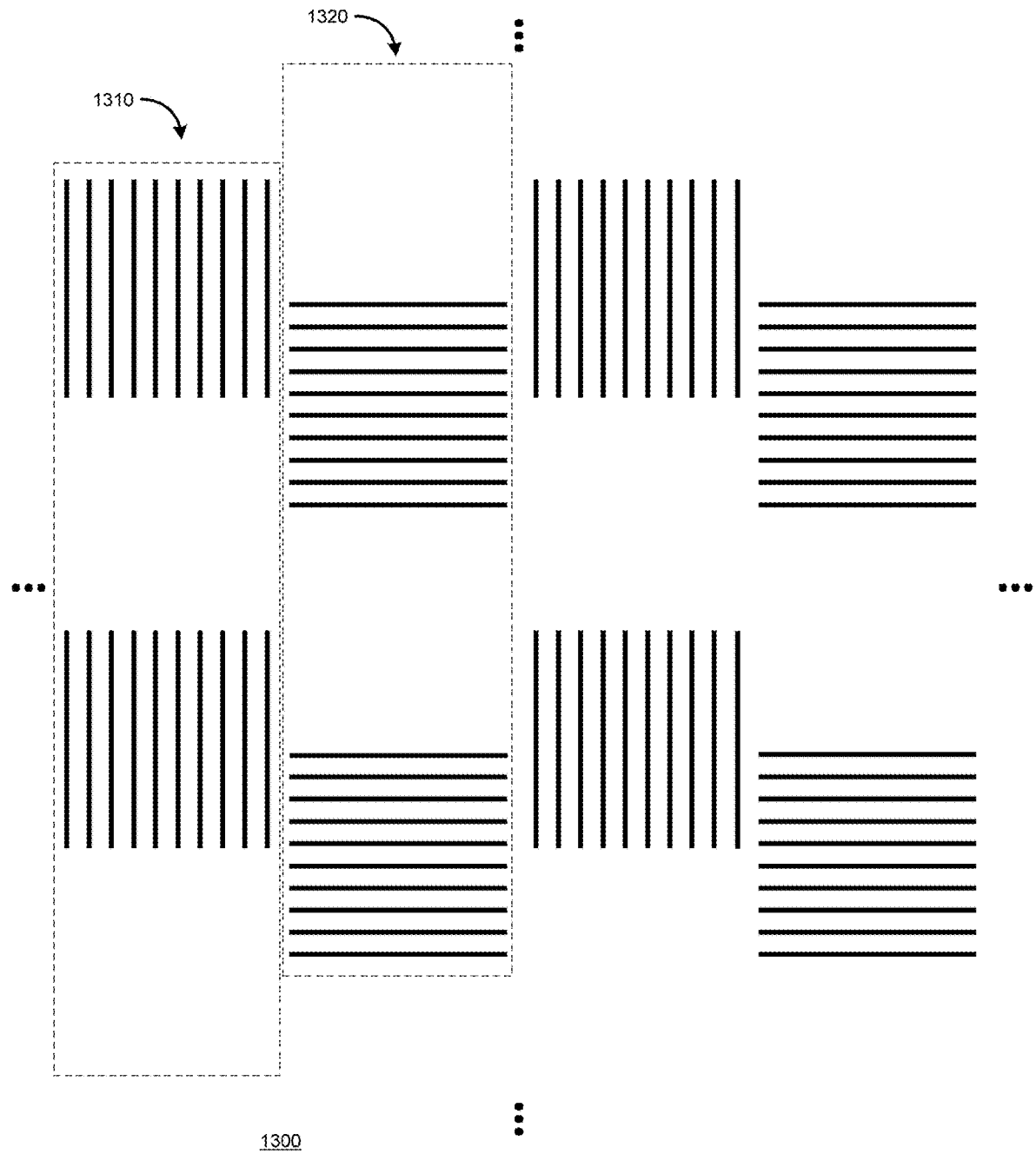
FIG. 13 depicts another example embodiment of a pattern of conductors for a conformal wave selector.

FIG. 13 depicts another example of a pattern of conductors for a conformal wave selector 1300. Region 1310 may include one or more regions of conductors all arranged in a direction of a first axis and one or more regions without conductors. Region 1320 may include one or more regions of conductors all arranged in a direction of a second axis that is normal to the first axis and one or more regions without conductors. Although the regions 1310 and 1320 are depicted to alternate horizontally in FIG. 13, several regions 1310, for example, may be repeated followed by several regions of 1320. As further depicted in FIG. 13, regions 1310 and 1320 may be offset from each other. The particular offset depicted in FIG. 13 is not meant to be limiting and may vary. The dashed lines depicted around regions 1310 and 1320 are meant to aid illustration only and are not conductors. The ellipses depicted in FIG. 13 are also meant to aid in illustration only and to signify that the pattern may continue in any direction. The ellipses are not conductors. As discussed above, a substantially equal distribution of conductors oriented in the direction of the first axis and in the direction of the second axis may be used so that the conformal wave selector does not reflect or allow to penetrate waves polarized in the direction of one of the axes more than the other axis. The particular pattern in which the regions are repeated in FIG. 13 should not be viewed as limiting and should only serve as an example. Other patterns are also possible.

Figure 14:
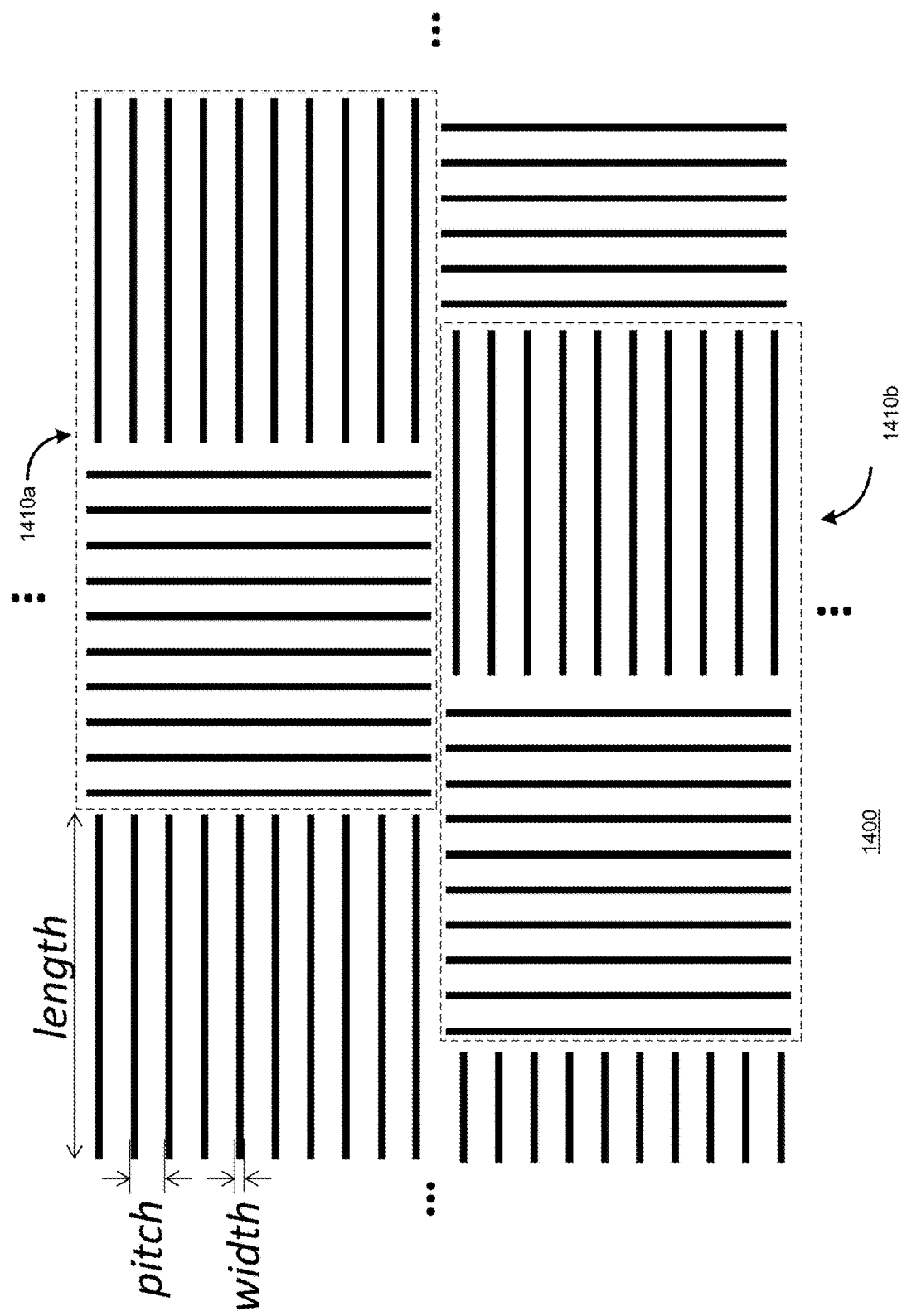
FIG. 14 depicts another example embodiment of a pattern of conductors for a conformal wave selector.

FIG. 14 depicts another example of a pattern of conductors for a conformal wave selector 1400. Region 1410a may include at least one subregion of conductors all arranged in a direction of a first axis and at least one subregion of conductors all arranged in a direction of a second axis that is normal to the first axis. Region 1410b may be similar to region 1410a. As further depicted in FIG. 14, regions 1410a and 1410b may be offset from each other. The particular offset depicted in FIG. 14 is not meant to be limiting and may vary. For example, region 1410a may be offset from 1410b in a vertical direction rather than in a horizontal direction as depicted in FIG. 14. Additionally or alternatively, region 1410a may be both vertically and horizontally offset from region 1410b. The dashed lines depicted around regions 1410a and 1410b are meant to aid illustration only and are not conductors. The ellipses depicted in FIG. 14 are also meant to aid in illustration only and to signify that the pattern may continue in any direction. The ellipses are not conductors. As discussed above, a substantially equal distribution of conductors oriented in the direction of the first axis and in the direction of the second axis may be used so that the conformal wave selector does not reflect or allow to penetrate waves polarized in the direction of one of the axes more than the other axis. The particular pattern in which the regions are repeated in FIG. 14 should not be viewed as limiting and should only serve as an example. Other patterns are also possible. The portion of the example pattern of conductors for a conformal wave selector 1400 depicted in FIG. 14 may further demonstrate that a pattern need not be comprised of only full regions such as region 1410a and 1410b. As can be seen in FIG. 14, portions of regions may be included in an embodiment of a conformal wave selector.

Figure 15:
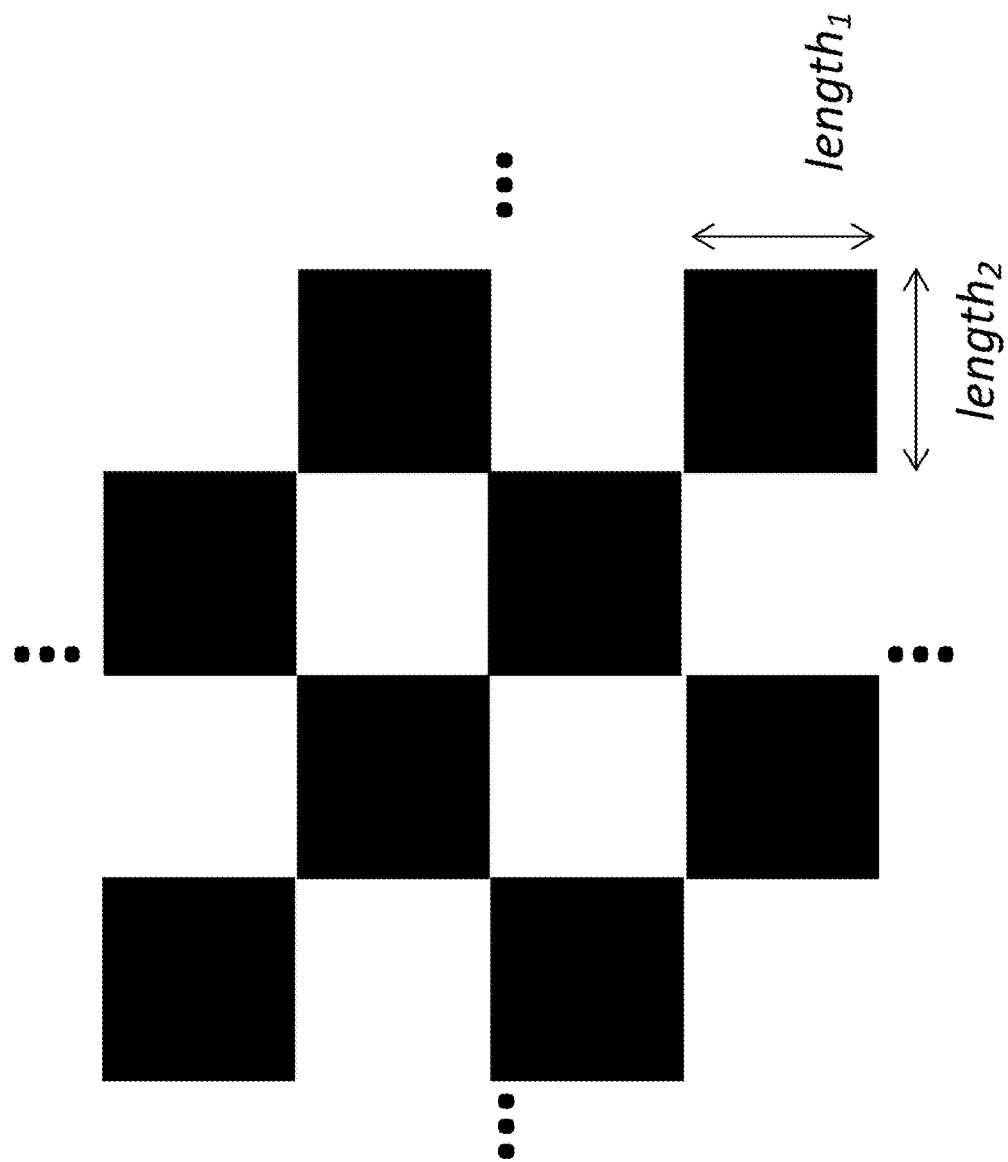
FIG. 15 depicts another example embodiment of a pattern of conductors for a conformal wave selector.

FIG. 15 depicts another example of a pattern of conductors for a conformal wave selector 1500. As depicted in FIG. 7, a checkered pattern of a plurality of conductors may be laid out. A conductor of the plurality of conductors may have a $length_1$ and $length_2$ defining its dimensions. Other conductors of the plurality of conductors may have the same dimensions or may have different dimensions. Each conductor may be sized such that $length_1$ and $length_2$ for a respective conductor may be longer than a maximum wavelength of an RF signal that is meant to be reflected by the conformal wave selector. In an example embodiment, $length_1$ and $length_2$ may be several times longer than the maximum wavelength of the RF signal that is meant to be reflected. For example, $length_1$ and $length_2$ may be four times longer than the maximum wavelength of the RF signal that is meant to be reflected. The particular dimensions shown in FIG. 15 are not meant to be limiting. For example, $length_1$ and $length_2$ may be the same length, may be similar lengths, or may be very different lengths. Furthermore, each conductor is depicted touching another conductor on each corner and a space between each conductor above/below and to the left/right of each conductor where there is no conductor. The pattern of conductors 1500 is an example and is not meant to be limited to this particular pattern and relative arrangement of conductors. For example, the conductors may not touch in a corner and may be spaced out further from each other. In another example, the conductors may be placed closer to each other such that there is less space between a pair of conductors.

FIG. 16 depicts an example embodiment of a method 1600 of applying a conformal wave selector to a surface of an object to interact with a first wireless RF signal transmitted by a first wireless system and a second wireless RF signal transmitted by another wireless system. In one embodiment, the first wireless system may be a WPTS and the first wireless RF signal may be a wireless power transmission. At 1610, a first set of parallel conductors may be applied to the surface in one or more regions and in a first direction. A length of each of the first set of parallel conductors may be substantially equal. The length of each of the first set of parallel conductors may be longer than a maximum wavelength of the first wireless RF signal, for example, the length may be at least four times as long as the maximum wavelength. A width of each of the first set of parallel conductors may be shorter than a minimum wavelength of the second wireless RF signal, for example, the width may be at least ten times shorter than the minimum wavelength. A ratio of the width of each of the first set of parallel conductors to a space between each of the first set of parallel conductors may be lower than a capacitive coupling threshold, such that a capacitive coupling between the first set of parallel conductors may not create an effective surface conductivity that interferes with a wave polarized normal to the first direction.

In FIG. 16, at 1620, a second set of parallel conductors may be applied to a surface in one or more other regions in a second direction that is normal to the first direction. The one or more other regions may not overlap the one or more regions in which the first set of parallel conductors have been applied. A length of each of the second set of parallel conductors may be substantially the same as the length of each of the first set of parallel conductors. A width of each of the second set of parallel conductors may be substantially the same as the width of each of the first set of parallel conductors. A ratio of the width of each of the second set of parallel conductors to a space between each of the second set of parallel conductors may be substantially the same as the ratio of the width of each of the first set of parallel conductors to the space between each of the first set of parallel conductors. Patterns for the first set and second set of parallel conductors may be applied to form patterns for a conformal wave selector in accordance with any of the embodiments described herein.

A conformal wave selector formed in accordance with the method of 1600 in FIG. 16 and including the first set of parallel conductors may reflect a portion of the first wireless RF signal polarized in the direction of the first axis by the first set of parallel conductors. Likewise, the second set of parallel conductors may reflect a portion of the second wireless RF signal polarized in the direction of the second axis. At the same time, the first set of parallel conductors and the second set of parallel conductors may allow at least a portion of the second wireless RF signal to penetrate through the first set of parallel conductors and the second set of parallel conductors.

FIG. 17 depicts another example embodiment of a method 1700 of applying a conformal wave selector to a surface of an object. At 1710, a colloid that carries conductive thread may be applied to the surface of the object. At 1720, the conductive thread may be magnetically aligned by applying a magnetic field. The conductive thread may be aligned such that it may form a pattern for a conformal wave selector in accordance with any of the embodiments described herein.

Figure 18:
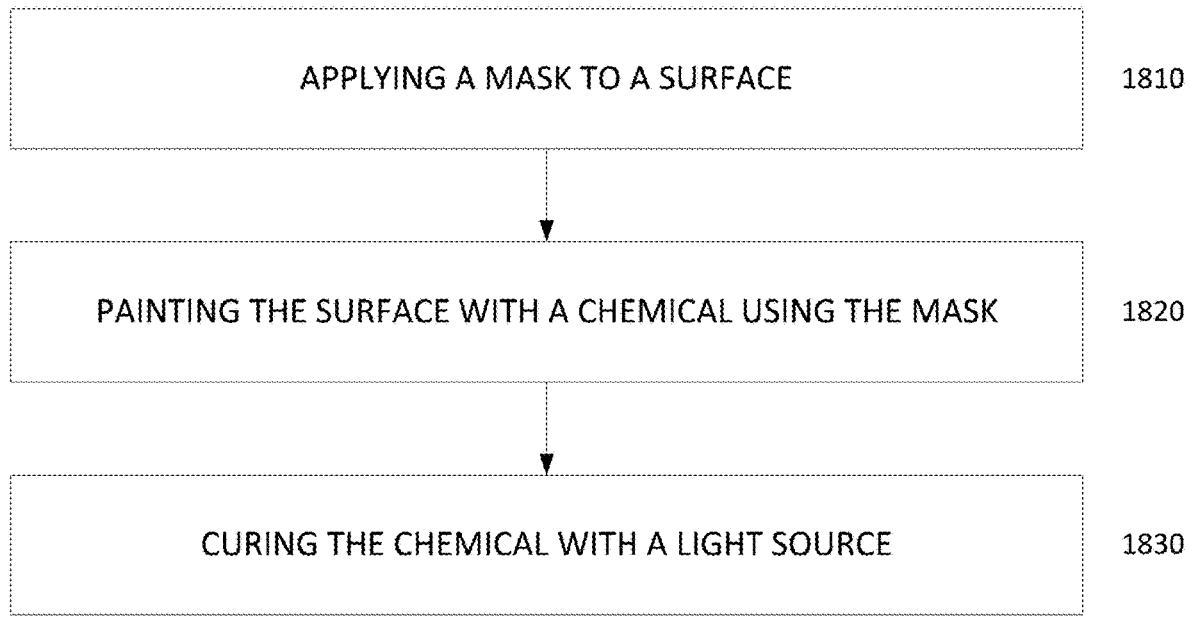
FIG. 18 depicts another example embodiment of a method for applying a conformal wave selector to a surface of an object.

FIG. 18 depicts another example embodiment of a method 1800 of applying a conformal wave selector to a surface of an object. At 1810, a mask may be applied to the surface of the object. At 1820, the surface may be painted with a chemical using the mask to form a pattern for a conformal wave selector in accordance with any of the embodiments described herein. At 1830, the chemical may be cured with a light source. Additionally or alternatively, the chemical may be cured in conjunction with the mask.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a WPTS or WPRC.

What is claimed is:

1. A conformal wave selector, the conformal wave selector comprising:
    a first plurality of parallel conductors; and
    a second plurality of parallel conductors arranged substantially perpendicular to the first plurality of parallel conductors;
    wherein the first and second plurality of parallel conductors are arranged to reflect a portion of a first wireless signal, and further wherein the first and second plurality of parallel conductors are arranged to allow at least a portion of second wireless signal to penetrate through the conformal wave selector wherein the first plurality of parallel conductors are arranged in a first region of a plane and the second plurality of parallel conductors are arranged in a second region of the plane; and wherein the first region does not overlap the second region.

2. The conformal wave selector of claim 1, wherein a length of each of the first plurality of parallel conductors and a length of each of the second plurality of parallel conductors is longer than a maximum wavelength of the first wireless signal.

3. The conformal wave selector of claim 2, wherein a width of each of the first plurality of parallel conductors and a width of each of the second plurality of parallel conductors is shorter than a minimum wavelength of the second wireless signal.

4. The conformal wave selector of claim 3, wherein a first ratio of the width of each of the first plurality of parallel conductors to a space between each of the first plurality of parallel conductors is below a capacitive coupling threshold, and wherein a second ratio of the width of each of the second plurality of parallel conductors to a space between each of the second plurality of parallel conductors is below the capacitive coupling threshold.

5. The conformal wave selector of claim 4, wherein an effective surface conductivity of the first plurality of parallel conductors does not interfere with a wave polarized normal to the first plurality of parallel conductors, and wherein an effective surface conductivity of the second plurality of parallel conductors does not interfere with a wave polarized normal to the second plurality of parallel conductors.

6. The conformal wave selector of claim 1, wherein the first wireless signal is a wireless power transmission and wherein the second wireless signal is a Wi-Fi signal.

7. The conformal wave selector of claim 1, wherein the first plurality of parallel conductors and the second plurality of parallel conductors are formed by magnetically aligned conductive threads in a colloid.

8. The conformal wave selector of claim 1, wherein the first plurality of parallel conductors and the second plurality of parallel conductors are formed by a painted a chemical on a surface to create an antenna pattern.

9. A method of forming a conformal wave selector on a surface of an object, the method comprising:
    applying to the surface a first plurality of parallel conductors; and
    applying to the surface a second plurality of parallel conductors that are substantially perpendicular to the first plurality of parallel conductors;
    wherein the first and second plurality of parallel conductors are applied to reflect a portion of a first wireless signal, and further wherein the first and second plurality of parallel conductors are arranged to allow at least a portion of second wireless signal to penetrate through the conformal wave selector wherein the first plurality of parallel conductors are applied in a first region of the surface and the second plurality of parallel conductors are applied in a second region of the surface; and wherein the first region does not overlap the second region.

10. The method of claim 9, wherein a length of each of the first plurality of parallel conductors and a length of each of the second plurality of parallel conductors is longer than a maximum wavelength of the first wireless signal.

11. The method of claim 9, wherein a width of each of the first plurality of parallel conductors and a width of each of the second plurality of parallel conductors is shorter than a minimum wavelength of the second wireless signal.

12. The method of claim 9, wherein a first ratio of the width of each of the first plurality of parallel conductors to a space between each of the first plurality of parallel conductors is below a capacitive coupling threshold, and wherein a second ratio of the width of each of the second plurality of parallel conductors to a space between each of the second plurality of parallel conductors is below the capacitive coupling threshold.

13. The method of claim 9, wherein an effective surface conductivity of the first plurality of parallel conductors does not interfere with a wave polarized normal to the first plurality of parallel conductors, and wherein an effective surface conductivity of the second plurality of parallel conductors does not interfere with a wave polarized normal to the second plurality of parallel conductors.

14. The method of claim 9, wherein the first wireless signal is a wireless power transmission and wherein the second wireless signal is a Wi-Fi signal.

15. The method of claim 9, wherein the applying the first plurality of parallel conductors and the second plurality of parallel conductors includes applying a colloid to the surface that carries conductive thread, and where the method further comprises:

magnetically aligning the conductive thread.

16. The method of claim 9, wherein the applying the first plurality of parallel conductors and the second plurality of parallel conductors includes painting the surface with a chemical using a mask to create an antenna pattern and curing the antenna pattern with a light source.

* * * * *